US012676689B2

(12) United States Patent
Yu et al.

(10) Patent No.: US 12,676,689 B2
(45) Date of Patent: Jul. 7, 2026

(54) CLOCK SYNCHRONIZATION METHOD, OPTICAL HEAD END, AND OPTICAL TERMINAL

(71) Applicant: HUAWEI TECHNOLOGIES CO., LTD., Shenzhen (CN)

(72) Inventors: Yang Yu, Cairo (EG); Chao Zhao, Xi'an (CN); Su Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 18/489,806

(22) Filed: Oct. 18, 2023

(65) Prior Publication Data

US 2024/0048260 A1     Feb. 8, 2024

Related U.S. Application Data

(63) Continuation of application No. PCT/CN2022/079316, filed on Mar. 4, 2022.

(30) Foreign Application Priority Data

Apr. 19, 2021     (CN) .......................... 202110421086.5

(51) Int. Cl.
| | |
|---|---|
| *H04J 3/06* | (2006.01) |
| *H04B 10/278* | (2013.01) |
| *H04L 7/00* | (2006.01) |

(52) U.S. Cl.
CPC .......... *H04J 3/0638* (2013.01); *H04B 10/278* (2013.01); *H04L 7/0091* (2013.01)

(58) Field of Classification Search
CPC ..... H04B 10/278; H04J 3/0638; H04L 7/0091

(Continued)

(56) References Cited

U.S. PATENT DOCUMENTS

| | | | | |
|---|---|---|---|---|
| 8,718,482 B1* | 5/2014 | Roberts | .................. | H04B 10/27 398/53 |
| 2011/0019681 A1* | 1/2011 | Gazier | .................. | H04J 3/0638 370/503 |

(Continued)

FOREIGN PATENT DOCUMENTS

| | | |
|---|---|---|
| CN | 106374443 A | 2/2017 |
| CN | 111446776 A | 7/2020 |

(Continued)

OTHER PUBLICATIONS

Series G: Transmission Systems and Media, Digital Systems and Networks Digital sections and digital line system—Optical line systems for local and access networks Gigabit-capable passive optical networks (GPON): General characteristics Recommendation ITU-T G.984.1, Mar. 2008, 43 pages.

(Continued)

*Primary Examiner* — Amritbir K Sandhu
(74) *Attorney, Agent, or Firm* — Fish & Richardson P.C.

(57) ABSTRACT

This application relates to clock synchronization methods optical head ends, and optical terminals. In an example method, the optical head end receives a first packet from a controller. The first packet includes service data to be transmitted to a plurality of slave stations. The optical head end generates a second packet based on the first packet. The second packet includes the service data and time information. The time information indicates an execution time point at which the plurality of slave stations perform an operation based on the service data. The optical head end further sends the second packet to the plurality of optical terminals to request the plurality of optical terminals to control the plurality of slave stations to perform the operation at the execution time point based on the service data.

20 Claims, 12 Drawing Sheets

(58) Field of Classification Search
USPC .......................................................... 398/60
See application file for complete search history.

(56) References Cited

U.S. PATENT DOCUMENTS

| | | | | |
|---|---|---|---|---|
| 2012/0008953 A1 * | 1/2012 | Lu | ...................... | H04Q 11/0067 |
| | | | | 398/66 |
| 2014/0226984 A1 * | 8/2014 | Roberts | .............. | H04Q 11/0001 |
| | | | | 398/66 |
| 2019/0342022 A1 * | 11/2019 | Zhou | ...................... | H04J 3/0632 |
| 2019/0387293 A1 * | 12/2019 | Hajduczenia | ...... | H04Q 11/0067 |
| 2020/0162181 A1 * | 5/2020 | Tang | ...................... | H04J 3/0664 |

FOREIGN PATENT DOCUMENTS

| | | | | | | |
|---|---|---|---|---|---|---|
| EP | | 1231813 | A2 * | 8/2002 | .......... | H04B 10/032 |
| EP | | 1802014 | A1 * | 6/2007 | .......... | H04J 3/0667 |
| EP | | 2410672 | A1 | 1/2012 | | |
| EP | | 3091676 | B1 * | 5/2021 | .......... | H04J 3/0605 |
| KR | | 20160024782 | A | 3/2016 | | |

OTHER PUBLICATIONS

IEEE Standard for a Precision Clock Synchronization Protocol for Networked Measurement and Control Systems IEEE Instrumentation and Measurement Society Developed by the Technical Committee on Sensor Technology (TC-9) IEEE Std 1588™—2019 (Revision of IEEE Std 1588-2008), Nov. 7, 2019, 499 pages.

International Search Report and Written Opinion in International Appln. No. PCT/CN2022/079316, mailed on May 13, 2022, 17 pages (with English translation).

Ericsson, "Transport of accurate Time Synchronization over access technologies," Telecommunication Standardization Sector, COM 15-C 977-E, May 2010, 12 pages.

International Telecommunication Union (ITU), "Series G: Transmission Systems and Media Digital Systems and Network; Digital sections and digital line system—Optical line systems for local and access networks; Gigabit-capable passive optical networks(GPON): General characteristics; Recommendation ITU-T G.984.1 (2008)—Amendment 2," Apr. 2012, 16 pages.

Extended European Search Report in European Appln No. 22790725. 0, dated Aug. 6, 2024, 9 pages.

* cited by examiner

CLOCK SYNCHRONIZATION METHOD, OPTICAL HEAD END, AND OPTICAL TERMINAL

CROSS-REFERENCE TO RELATED APPLICATIONS

This application is a continuation of International Application No. PCT/CN2022/079316, filed on Mar. 4, 2022, which claims priority to Chinese Patent Application No. 202110421086.5, filed on Apr. 19, 2021. The disclosures of the aforementioned applications are hereby incorporated by reference in their entireties.

TECHNICAL FIELD

This application relates to the field of network technologies, and in particular, to a clock synchronization method, an optical head end, and an optical terminal.

BACKGROUND

Synchronization usually includes clock synchronization, phase synchronization, and time synchronization. The clock synchronization is also referred to as frequency synchronization, and means that different signals have a same quantity of pulses within a same time interval. The phase synchronization means that two signals are of a same frequency and each pulse shares a same start time and end time. The time synchronization means that two signals are of a same frequency and phase, and pulses appear in a same order.

In a related technology, the Ethernet control automation technology (EtherCAT) is used to implement clock synchronization. EtherCAT uses a serial bus architecture. An EtherCAT network includes one master station and a plurality of slave stations. In an EtherCAT-based clock synchronization method, the first slave station connected to the master station and having a distributed clock function is used as a reference clock. The master station measures and calculates an offset between a clock of each slave station and the reference clock. The master station calibrates the clock of each slave station based on the offset corresponding to each slave station, to implement clock synchronization. A distributed clock (DC) is a type of hardware distributed in each slave station in EtherCAT. The distributed clock is configured to control all slave stations to use same system time, to control all the slave stations to simultaneously perform an action.

The method for implementing clock synchronization based on the distributed clock provided in EtherCAT is applicable only to an EtherCAT bus, and is not applicable to other system architectures. Therefore, the method has limited applications.

SUMMARY

Embodiments of this application provide a clock synchronization method, an optical head end, and an optical terminal, to support clock synchronization in a system architecture based on optical bearer service data. Technical solutions are described as follows:

According to a first aspect, a clock synchronization method is provided. The method is applied to an optical bus network. The optical bus network includes a controller, an optical head end, a plurality of optical terminals, and a plurality of slave stations. From a perspective of the optical head end, the method includes: The optical head end receives a first packet from the controller, where the first packet includes service data to be transmitted to the plurality of slave stations. The optical head end generates a second packet based on the first packet, where the second packet includes the service data and time information, and the time information indicates an execution time point at which the plurality of slave stations perform an operation based on the service data. The optical head end sends the second packet to the plurality of optical terminals, so that the plurality of optical terminals control the plurality of slave stations to perform the operation at the execution time point based on the service data.

The foregoing provides a method for supporting clock synchronization in an industrial optical bus network. In the method, an optical head end and a plurality of optical terminals transfer service data exchanged between a controller and a plurality of slave stations, and a packet sent by the optical head end to the plurality of optical terminals carries information related to a time point at which the slave stations perform an operation, to indicate the plurality of slave stations to perform the operation at the time point. In this way, the plurality of slave stations in a system perform the operation at the same time point, thereby implementing clock synchronization. The method meets a clock synchronization requirement posed after optical communication is introduced into an industrial field bus, and is applicable to a system architecture based on optical bearer service data, thereby overcoming limitations of related technologies to some extent.

In some implementations, the time information carried in the second packet sent by the optical head end specifically includes reference time.

In some implementations, the reference time carried in the second packet sent by the optical head end is specifically a timestamp added by the optical head end.

The optical head end writes, into a packet, a timestamp at which a packet from the controller is received, and transfers the packet including the timestamp to the slave stations through the optical terminals, to provide a start time point for a synchronization cycle of the entire system. Therefore, in the entire system, a time point for performing an operation is determined by using time of the optical head end as a reference, so that the operation is performed synchronously, thereby implementing clock synchronization in the entire system.

In some implementations, the first packet sent by the controller further includes a timestamp added by the controller, and the reference time carried in the second packet sent by the optical head end is specifically the timestamp added by the controller and included in the first packet.

The controller writes a timestamp into a packet, and transfers the packet including the timestamp to the slave stations through the optical head end and the optical terminals, to provide a start time point for a synchronization cycle of the entire system. Therefore, in the entire system, a time point for performing an operation is determined by using time of the controller as a reference, so that the operation is performed synchronously, thereby implementing time synchronization in the entire system.

In some implementations, the time information further includes a compensation delay, and the compensation delay indicates a time difference between the reference time and the execution time point.

The optical head end writes a compensation delay into a packet, and transfers the compensation delay and a reference time together to the optical terminals through the packet, to provide more reference information for a process of determining a time point at which the slave stations perform an operation. This helps compensate for a delay caused by various factors such as an internal processing action of the device and an actual network environment, thereby reducing impact of the factors on time synchronization and improving time synchronization precision.

In some implementations, the compensation delay includes any one or combination of the following:

dwelt duration, where the dwelt duration indicates duration for which the first packet is dwelt on the optical head end;

an equalization delay, where the equalization delay indicates a transmission delay between a farthest optical terminal and the optical head end, and the farthest optical terminal is the optical terminal farthest from the optical head end among the plurality of optical terminals;

first offset duration, where the first offset duration indicates duration required by a slave station with a lowest processing speed among the plurality of slave stations to process the service data;

second offset duration, where the second offset duration indicates duration required by the slave station with the slowest processing speed to proceed from executing an instruction of the controller to starting a data collection operation; and a transmission delay, where the transmission delay indicates a delay of transmitting the first packet from the controller to the optical head end.

The consideration of the dwelt duration in the synchronization process helps compensate for a delay caused by a packet staying in the optical head end and waiting for processing by the optical head end, thereby improving the time synchronization precision.

The consideration of the equalization delay in the synchronization process avoids impact of inconsistent distances between the optical terminals and the optical head end on time synchronization, thereby improving the time synchronization precision.

The consideration of the first offset duration in the synchronization process avoids impact caused by inconsistent data processing time of the slave stations, allowing all the slave stations to execute the instruction simultaneously.

The consideration of the second offset duration in the synchronization process to compensate for a processing time of each slave station avoids impact caused by inconsistent processing time of the slave stations on time synchronization, allowing all the slave stations to collect data simultaneously.

The consideration of the transmission delay in the synchronization process to compensate for a delay caused by transmission of the packet from the controller to the optical head end avoids impact of the delay on time synchronization, thereby improving the time synchronization precision.

In some implementations, the time information indicates the execution time point at which the plurality of slave stations perform the operation based on the service data.

The optical head end calculates the time point at which the slave stations perform the operation, writes the time point at which the slave stations perform the operation into a packet, and transfers the packet to the slave stations through the optical terminals. Therefore, the optical terminals do not need to separately perform a task of calculating the time point, and an advantage of the optical head end in computing performance is more fully utilized, thereby improving overall synchronization efficiency and resource utilization of the system.

In some implementations, the execution time point indicated by the time information includes a first time point, and the controlling the plurality of slave stations to perform the operation at the execution time point based on the service data includes: controlling the plurality of slave stations to execute an instruction included in the service data at the first time point.

The foregoing manner supports an instruction execution scenario, allowing the plurality of slave stations in the system to execute the instruction from the controller simultaneously.

In some implementations, the execution time point indicated by the time information includes a second time point, and the controlling the plurality of slave stations to perform the operation at the execution time point based on the service data includes: controlling the plurality of slave stations to perform a data collection operation at the second time point.

The foregoing manner supports a collection and reporting scenario, allowing the plurality of slave stations in the system to collect data simultaneously.

In some implementations, after the optical head end sends the second packet to the plurality of optical terminals, the method further includes: The optical head end receives collected data sent by the plurality of optical terminals, where the collected data is obtained by the plurality of slave stations by performing the data collection operation. The optical head end sends the collected data to the controller.

In some implementations, the time information is carried in a timestamp field of the second packet.

With the use of the timestamp field to carry information related to the time point at which the slave stations perform the operation, a packet format in this solution is more compatible with an existing packet format in an optical bus protocol, thereby reducing implementation complexity.

In some implementations, the time information is carried in a protocol data unit PDU field of the second packet.

With the use of the PDU field to carry information related to the time point at which the slave stations perform the operation, more bytes can be used to carry richer information, thereby improving flexibility.

According to a second aspect, a clock synchronization method is provided. The method is applied to an optical bus network. The optical bus network includes a controller, an optical head end, a plurality of optical terminals, and a plurality of slave stations. The plurality of optical terminals include a first optical terminal. The plurality of slave stations include a first slave station connected to the first optical terminal. The method includes:

The first optical terminal receives a packet from the optical head end, where the packet includes service data from the controller and time information, and the time information indicates an execution time point at which the plurality of slave stations perform an operation based on the service data.

The first optical terminal determines the execution time point based on the time information.

The first optical terminal controls the first slave station to perform the operation at the execution time point based on the service data.

In some implementations, the time information includes reference time, and that the first optical terminal determines the execution time point based on the time information includes:

The first optical terminal determines the execution time point based on the reference time and a compensation delay, where the compensation delay indicates a time difference between the reference time and the execution time point.

In some implementations, the compensation delay includes any one or combination of the following:

dwelt duration, where the dwelt duration indicates duration for which the packet is dwelt on the optical head end;

an equalization delay, where the equalization delay indicates a transmission delay between a farthest optical terminal and the optical head end, and the farthest optical terminal is the optical terminal farthest from the optical head end among the plurality of optical terminals;

first offset duration, where the first offset duration indicates duration required by a slave station with a lowest processing speed among the plurality of slave stations to process the service data;

second offset duration, where the second offset duration indicates duration required by the slave station with the slowest processing speed to proceed from executing an instruction of the controller to starting a data collection operation; and a transmission delay, where the transmission delay indicates a delay of transmitting the packet from the controller to the first optical head end.

In some implementations, the compensation delay is carried in the packet; or before the first optical terminal receives the packet from the optical head end, the method further includes: The first optical terminal receives the compensation delay from the optical head end.

In some implementations, the time information indicates the execution time point at which the first slave station performs the operation based on the service data, and that the first optical terminal determines the execution time point based on the time information includes:

The first optical terminal uses a time point indicated by the time information as the execution time point.

In some implementations, the execution time point indicated by the time information includes a first time point, and that the first optical terminal controls the first slave station to perform the operation at the first time point based on the service data includes:

The first optical terminal controls the first slave station to execute an instruction included in the service data at the first time point.

In some implementations, the execution time point indicated by the time information includes a second time point, and that the first optical terminal controls the first slave station to perform the operation at the execution time point based on the service data includes:

The first optical terminal controls the first slave station to perform a data collection operation at the second time point.

In some implementations, after the first optical terminal controls the first slave station to perform a data collection operation at the second time point, the method further includes:

The first optical terminal receives collected data sent by the first slave station, where the collected data is obtained by the first slave station by performing the data collection operation.

The first optical terminal sends the collected data to the optical head end.

In some implementations, that the first optical terminal controls the first slave station to perform the operation at the execution time point based on the service data includes:

The first optical terminal sends the service data to the first slave station.

The first optical terminal generates a synchronization signal at the execution time point, where the synchronization signal is used for triggering the first slave station to start the operation based on the service data.

The first optical terminal sends the synchronization signal to the first slave station.

According to a third aspect, an optical head end is provided. The optical head end includes at least one unit. The at least one unit is configured to implement the method according to any one of the first aspect or the optional implementations of the first aspect. In some embodiments, a unit in the optical head end is implemented through software, and the unit in the optical head end is a program module. In some other embodiments, a unit in the optical head end is implemented through hardware or firmware. For specific details of the optical head end provided in the third aspect, refer to any one of the first aspect or the optional implementations of the first aspect. Details are not described herein again.

According to a fourth aspect, an optical terminal is provided. The optical terminal includes at least one unit. The at least one unit is configured to implement the method according to any one of the second aspect or the optional implementations of the second aspect. In some embodiments, a unit in the optical terminal is implemented through software, and the unit in the optical terminal is a program module. In some other embodiments, a unit in the optical terminal is implemented through hardware or firmware. For specific details of the optical terminal provided in the fourth aspect, refer to any one of the second aspect or the optional implementations of the second aspect. Details are not described herein again.

According to a fifth aspect, an optical head end is provided. The optical head end includes a processor and a network interface. The processor is configured to execute instructions to enable the optical head end to perform the method according to any one of the first aspect or the optional implementations of the first aspect. The network interface is configured to receive or send a packet. For specific details of the optical head end provided in the fifth aspect, refer to any one of the first aspect or the optional implementations of the first aspect. Details are not described herein again.

According to a sixth aspect, an optical terminal is provided. The optical terminal includes a processor and a network interface. The processor is configured to execute instructions to enable the optical terminal to perform the method according to any one of the second aspect or the optional implementations of the second aspect. The network interface is configured to receive or send a packet. For specific details of the optical terminal provided in the sixth aspect, refer to any one of the second aspect or the optional implementations of the second aspect. Details are not described herein again.

According to a seventh aspect, a computer-readable storage medium is provided. The storage medium stores at least one instruction. When the instruction is run on a computer, the computer is enabled to perform the method according any one of to the first aspect or the optional implementations of the first aspect.

According to an eighth aspect, a computer-readable storage medium is provided. The storage medium stores at least one instruction. When the instruction is run on a computer, the computer is enabled to perform the method according any one of to the second aspect or the optional implementations of the second aspect.

According to a ninth aspect, a computer program product is provided. The computer program product includes one or more computer program instructions. When the computer program instructions are loaded and run by a computer, the computer is enabled to perform the method according to any one of the first aspect or the optional implementations of the first aspect.

According to a tenth aspect, a computer program product is provided. The computer program product includes one or more computer program instructions. When the computer program instructions are loaded and run by a computer, the computer is enabled to perform the method according to any one of the second aspect or the optional implementations of the second aspect.

According to an eleventh aspect, a chip is provided, including a memory and a processor. The memory is configured to store computer instructions. The processor is configured to call the computer instructions from the memory and run the computer instructions, to perform the method according to any one of the first aspect or the possible implementations of the first aspect.

According to a twelfth aspect, a chip is provided, including a memory and a processor. The memory is configured to store computer instructions. The processor is configured to call the computer instructions from the memory and run the computer instructions, to perform the method according to any one of the second aspect or the optional implementations of the second aspect.

According to a thirteenth aspect, a network system is provided. The network system includes the optical head end according to any one of the first aspect or the optional implementations of the first aspect and the optical terminal according to any one of the second aspect or the optional implementations of the second aspect.

DESCRIPTION OF EMBODIMENTS

To make the objectives, technical solutions, and advantages of this application clearer, the following further describes implementations of this application in detail with reference to the accompanying drawings.

The following explains and describes some terms and concepts in embodiments of this application.

(1) Field Bus

The field bus, or referred to as an industrial field bus, is an industrial data bus developed rapidly in recent years, and mainly resolves problems of digital communication between field devices such as an intelligent instrument, a controller, and an actuator mechanism in an industrial field and information transfer between the field control devices and advanced control systems.

(2) Optical Bus (OptiXBus)

The optical bus is also referred to as an industrial optical bus (JOB). The optical bus is used to merge an industrial control network and a PON into one, so that information that needs to be exchanged in the industrial control network can be transmitted based on the PON. A basic principle for implementing this function is that both the industrial control network and the PON are point-to-multipoint communication networks. A typical characteristic of the industrial control network is that one controller is connected to a plurality of slave stations. A typical characteristic of the PON is that one OLT is connected to a plurality of ONUs. The PON is introduced into the industrial control network by introducing the PON between the controller and the slave stations, associating the OLT with the controller, and associating the ONUs with the slave stations. The PON can serve as a communication channel between the controller and the slave stations, to transfer service data exchanged between the controller and the slave stations. In this way, a performance advantage brought by fiber-optic communication in the PON is fully utilized while meeting a communication requirement in an industrial field network.

(3) Synchronization

Synchronization usually includes frequency synchronization, phase synchronization, and time synchronization. Different systems usually require different synchronization manners. For example, a synchronous digital hierarchy (SDH) network is a frequency synchronization system. The SDH network requires frequency synchronization between different network elements to ensure normal transmission of an SDH service. For another example, a time division-synchronous code division multiple access (TD-SCDMA) base station is a time synchronization system. TD-SCDMA requires time synchronization between neighboring base stations to ensure normal operation of an air interface.

(4) Frequency Synchronization

The frequency synchronization means that different signals have a same quantity of pulses within each same time interval. The frequency synchronization is usually irrelevant to an order of appearance of pulses and a start time and an end time of each pulse.

Figure 1:
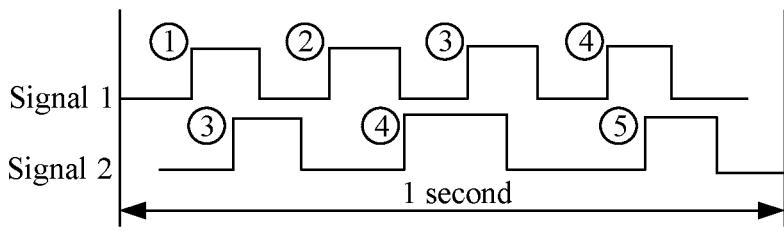
FIG. 1 is a schematic diagram of waveforms of signals with poor frequency synchronization according to an embodiment of this application.

FIG. 1 shows a specific example of two signals with poor frequency synchronization. Refer to FIG. 1. In each time interval or cycle of 1 s, the two signals, namely, a signal 1 and a signal 2, have different quantities of pulses. The signal 1 has four pulses (pulses 1, 2, 3, and 4), and the signal 2 has only three pulses (pulses 3, 4, and 5). In this case, it may be considered that frequencies of the two signals are not synchronous, or frequency synchronization between the two signals is very poor.

Figure 2:
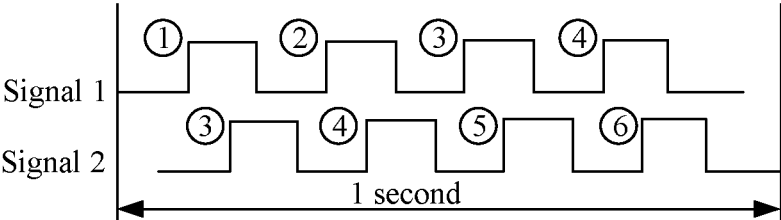
FIG. 2 is a schematic diagram of waveforms of signals with good frequency synchronization according to an embodiment of this application.

FIG. 2 shows a specific example of two signals with good frequency synchronization. Refer to FIG. 2. The two signals, namely, a signal 1 and a signal 2, have a same quantity of pulses in each same time interval. Specifically, in each time interval or cycle of 1 s, the signal 1 has four pulses (pulses 1, 2, 3, and 4), and the signal 2 also has four pulses (pulses 3, 4, 5, and 6). In this case, it may be considered that frequencies of the two signals are synchronous, or frequency synchronization between the two signals is good.

It may be learned from FIG. 1 and FIG. 2 that the frequency synchronization is usually relevant only to whether different signals have a same quantity of pulses in each same time interval, but is irrelevant to the order of appearance of pulses and the start time and the end time of each pulse. To be specific, the pulses of the signal 1 may be the first, second, third, and fourth pulses, the pulses of the signal 2 may be the third, fourth, fifth, and sixth pulses, and each pulse may have a different start time and end time.

(5) Phase Synchronization

The phase synchronization means that two signals are of a same frequency and each pulse shares a same start time and end time. The phase synchronization is usually irrelevant to an order of appearance of pulses. In examples shown in FIG. 3 and FIG. 4, two signals, namely, a signal 1 and a signal 2, are of a same frequency, and the two signals have a same quantity of pulses in each time interval or cycle of 1 s.

Figure 3:
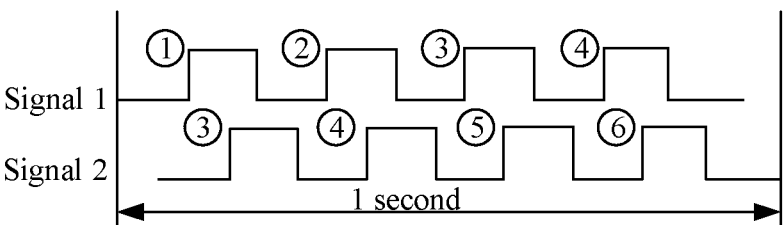
FIG. 3 is a schematic diagram of waveforms of signals with poor phase synchronization according to an embodiment of this application.

FIG. 3 shows a specific example of two signals with poor phase synchronization. Refer to FIG. 3. In the two signals, namely, the signal 1 and the signal 2, each pulse has a different start time and end time. For example, the first pulse of the signal 1 and the third pulse of the signal 2 have different start time and end time (rising edges and falling edges of the pulses are not aligned). Therefore, phase synchronization between the two signals, namely, the signal 1 and the signal 2, is poor.

Figure 4:
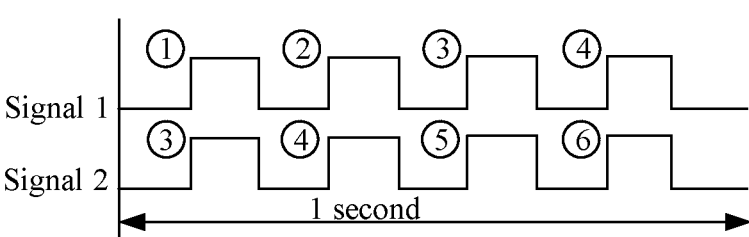
FIG. 4 is a schematic diagram of waveforms of signals with good phase synchronization according to an embodiment of this application.

FIG. 4 shows a specific example of two signals with good phase synchronization. Refer to FIG. 4. In the two signals, namely, the signal 1 and the signal 2, each pulse has a same start time and end time. For example, in FIG. 4, the first pulse of the signal 1 and the third pulse of the signal 2 have a same start time and end time. Therefore, phase synchronization between the two signals is good.

(6) Time Synchronization

The time synchronization means that two signals are of a same frequency and phase, and pulses appear in a same order.

Figure 5:
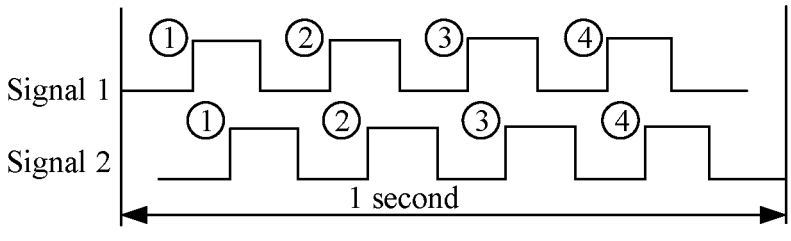
FIG. 5 is a schematic diagram of waveforms of signals with poor time synchronization according to an embodiment of this application.

FIG. 5 shows a specific example of two signals with poor time synchronization. Refer to FIG. 5. The two signals, namely, a signal 1 and a signal 2, are of a same frequency, and pulses in the two signals appear in a same order. To be specific, the signal 1 and the signal 2 appear simultaneously in an order of pulses 1, 2, 3, and 4. However, phases of the pulses of the signal 1 and the signal 2 are not well synchronized. It may be considered that the time synchronization between the two signals is poor.

Figure 6:
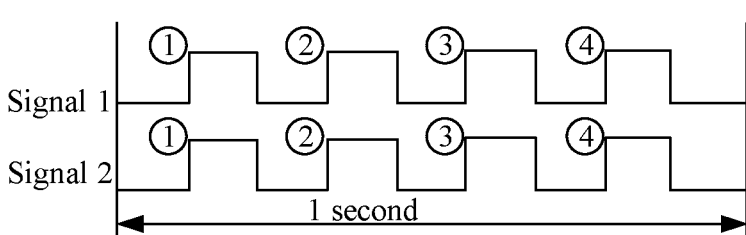
FIG. 6 is a schematic diagram of waveforms of signals with good time synchronization according to an embodiment of this application.

FIG. 6 shows a specific example of two signals with good time synchronization. Refer to FIG. 6. The two signals, namely, a signal 1 and a signal 2, are of a same frequency, pulses in the two signals appear in a same order, and phases of the pulses are synchronous.

(7) Equalization Delay (EqD)

The equalization delay is a parameter determined based on a GPON ranging technology. The following describes a principle of the ranging technology.

The ranging technology is a key technology in gigabit-capable passive optical networks (GPONs). The ranging technology ensures that uplink data sent by optical network units (ONUs) does not conflict with each other.

A typical technical problem resolved by the ranging technology is that because distances from the ONUs to an optical line terminal (OLT) are different, different time lengths are required for transmitting optical signals from different ONUs over an optical fiber, and consequently the optical signals from the different ONUs arrive at the OLT at different time points, resulting in a collision or conflict between uplink data.

A technical concept of the ranging technology is based on an ideal case in which each of the ONUs is on a concentric circle with respect to the OLT and time lengths required for transmitting signals from the ONUs to the OLT are equal. Therefore, based on this concept, a GPON system uses a method using a delay from the OLT to a farthest ONU as a reference. In this method, a delay from the OLT to each ONU is calculated, and a distance between the OLT and each ONU is accurately calculated. For an ONU closer to the OLT, a delay is added to the delay from the ONU to the OLT, to synchronize a time of arrival of a signal from the ONU to the OLT with a time of arrival of a signal from the farthest ONU to the OLT. A purpose of adding the delay is to ensure that logical distances from all the ONUs to the OLT are equal. In other words, from a perspective of the OLT, transmission distances of all the ONUs are equal. The delay added for the ONU is referred to as the equalization delay, and the entire process is referred to as ranging.

In a basic ranging process, the OLT enables a ranging function when each ONU registers for the first time, to measure a distance between each ONU and the OLT. The OLT obtains a round trip delay (RTD) of each ONU and calculates the distance between each ONU and the OLT. The OLT specifies a proper equalization delay (EqD) based on the distance of each ONU. The OLT controls, based on the RTD and the EqD, a moment at which each ONU is about to send uplink data, to eliminate impact caused by differences between the distances of the ONUs, thereby achieving an effect equivalent to that in a case in which all ONUs at the same logical distance send data in corresponding slots. In this way, frames sent by the ONUs are synchronized, thereby ensuring that data sent by the ONUs does not conflict with each other in an optical splitter.

(8) Three-Loop Control Operation

Three-loop control is a technology for motion control of a servo motor in the field of industrial control. Three-loop means a current loop, a velocity loop, and a position loop. The current loop is configured to control a torque of the motor. The velocity loop is configured to control a rotation speed of the motor. The position loop is configured to detect whether the servo motor moves to a position specified by a position control command output by a controller. An input of a current loop operation is an output obtained after PID adjustment performed by the velocity loop. An input value of the current loop is compared with a feedback value of the current loop to obtain a difference, which is subject to proportional-integral-differential (PID) adjustment and output to the motor. An output of the current loop is a phase current of each phase of the motor. An input of a velocity loop operation is an output obtained after position adjustment and a feedforward value of position setting. A velocity loop input value is compared with a velocity loop feedback value to obtain a difference, which is subject to PID adjustment (mainly proportional gain and differential processing) and output to the current loop. A position loop operation is to determine a value of a rotation speed based on a frequency of an external input pulse, and determine a rotation angle based on a quantity of pulse.

The following describes an example of a system architecture in embodiments of this application.

Figure 7:
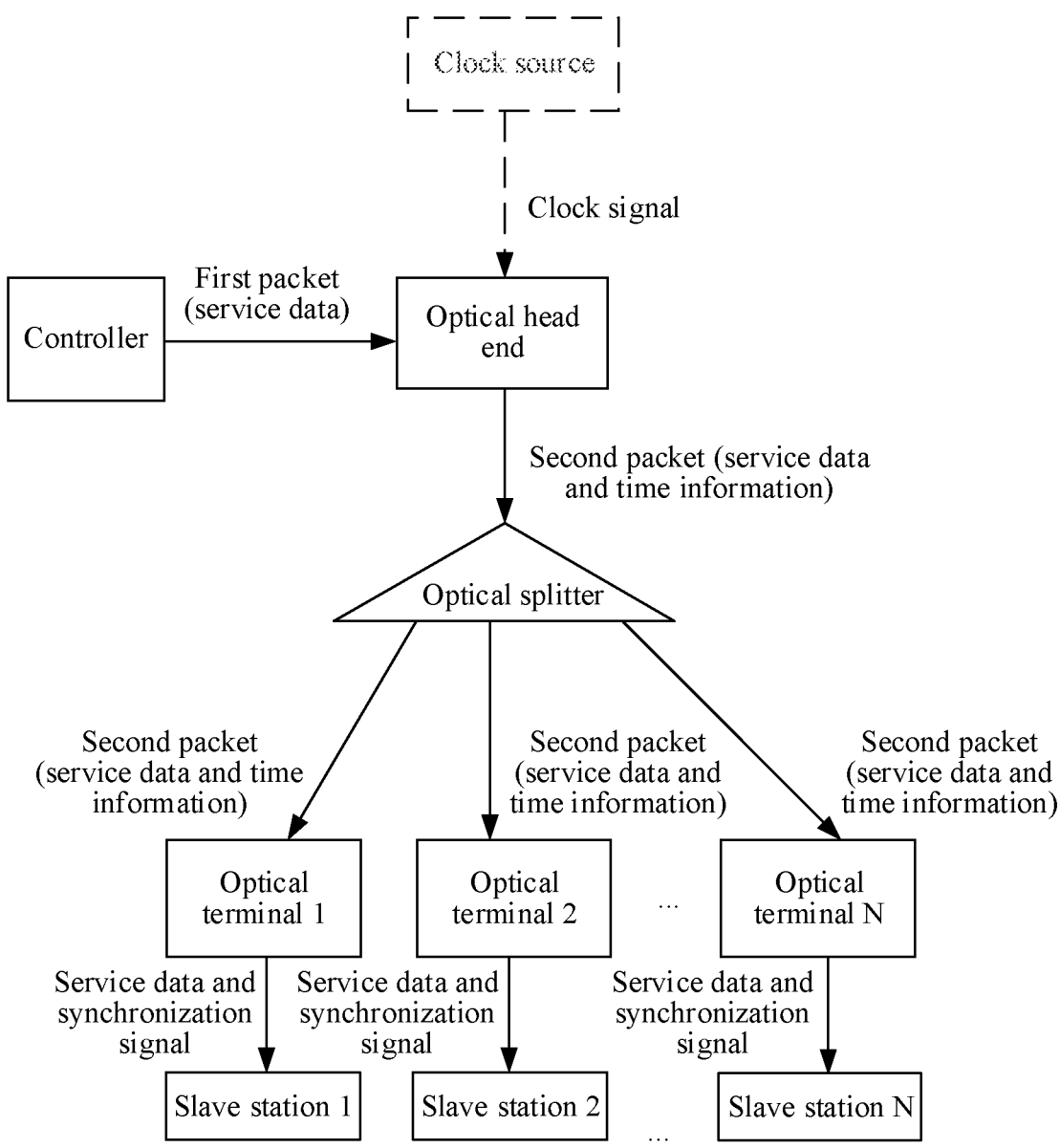
FIG. 7 is a schematic diagram of an optical bus network architecture according to an embodiment of this application.

FIG. 7 is a schematic diagram of an optical bus network architecture according to an embodiment of this application. The network architecture shown in FIG. 7 includes a controller, an optical head end (OHE), N optical terminals (OTs), and N slave stations. N is a positive integer greater than or equal to 2. Optionally, the optical head end is implemented through an OLT, and the optical terminals are implemented through ONUs. The following specifically describes the devices in FIG. 7.

(1) Controller

The controller is configured to control the N slave stations to perform an operation. The controller and the N slave stations operate in master-slave mode. The controller plays a role of a master node, and each of the N slave stations plays a role of a slave node. In some embodiments of this application, the controller is specifically configured to periodically generate a packet. The packet carries service data to be transmitted to the slave stations. Optionally, the packet generated by the controller further includes a timestamp.

A typical form of the controller is a programmable logic controller (PLC). Alternatively, the controller is a hardware device having a computing processing capability other than the PLC, for example, a motion controller.

The controller is connected to the optical head end through an interface. The interface between the controller and the optical head end is, for example, a high-speed serial computer expansion bus standard (peripheral component interconnect express, PCIe) interface or an Ethernet (Eth) interface. The controller communicates with the optical head end based on an optical bus protocol.

In FIG. 7, an example in which the controller is connected to one optical head end is used for description. In some other embodiments, the controller is connected to two or more optical head ends.

(2) Optical Head End

The optical head end is configured to interact with the controller and the N optical terminals. Specifically, the optical head end parses out the service data from the packet sent by the controller, encapsulates the service data into a packet by using a frame structure suitable for PON transmission, and delivers the packet to the optical terminals. In some embodiments of this application, the optical head end is specifically configured to encapsulate time-related information such as a timestamp and a compensation delay together with the service data into the packet.

The optical head end is connected to a plurality of optical terminals through an optical distribution network (ODN). The ODN includes an optical splitter shown in FIG. 7. For example, the optical splitter is a 1:N optical splitter. An uplink optical interface of the optical splitter is connected to the optical head end, and a downlink optical interface of the optical splitter is connected to the N optical terminals, to support point-to-multipoint communication between the optical head end and the N optical terminals.

In some embodiments, the optical head end is further connected to an external clock source. The clock source is configured to provide a clock signal. The optical head end performs clock synchronization and time synchronization with the plurality of optical terminals based on the clock signal input by the clock source. Types of clock signals include but are not limited to a 1588v2 clock (a high-precision clock using the IEEE 1588V2 protocol) signal, a synchronous Ethernet (a technology that uses an Ethernet link bit stream to recover the clock, SyncE) clock signal, a building integrated timing supply system (BITS) clock signal, 1 pulse per second (1PPS)+time information (TOD), and the like.

(3) Optical Terminal

The optical terminal is configured to interact with the optical head end and the slave station. The optical terminal parses out the service data from the packet sent by the optical head end, and provides the service data to the slave station. In some embodiments of this application, the optical terminal is specifically configured to control, based on time-related information carried in a downlink packet, the slave station to perform an operation at a specified time point based on the service data. The optical terminal is connected to the slave station through an interface. The interface between the optical terminal and the slave station is, for example, a serial peripheral interface (SPI), an input/output (I/O) interface, or the like.

(4) Slave Station

The slave station is configured to perform a corresponding operation based on the service data sent by the controller, for example, perform instruction execution and data reporting.

The slave station is, for example, an industrial device or a control module of an industrial device. The industrial device is, for example, a sensor, a server, an industrial robot, a mechanical arm, a switch, or an I/O device.

In FIG. 7, an example in which the optical terminal and the slave station are disposed in a standalone configuration is used for description. Alternatively, the optical terminal and the slave station are disposed in an integrated configuration. For example, an optical terminal 1 and a slave station 1 are located in a same physical device, and an optical terminal 2 and a slave station 2 are located in a same physical device. The integrated configuration means that the devices are integrated into a same physical device. The standalone configuration means that the devices are implemented through different physical devices communicatively coupled to each other.

The following describes some problems of conventional industrial field buses that can be resolved by the network architecture shown in FIG. 7 and some effects brought by the network architecture.

Existing industrial field buses such as EtherCAT and Ethernet POWERLINK usually have the following problem (1) to problem (4).

Problem (1): A delay cannot be reduced when there are a large quantity of nodes.

Problem (2): Direct communication between nodes is not supported.

Problem (3): A twisted pair network cable is easily affected by electromagnetic radiation, resulting in a bit error.

Problem (4): Ordinary service bearer (such as an industrial camera) is not supported.

The network architecture in FIG. 7 not only supports the following clock synchronization and time synchronization solutions, but also can resolve the foregoing problem (1) to problem (4). The following analyzes principles of resolving the foregoing problem (1) to problem (4).

For the foregoing problem (1), EtherCAT uses a serial bus architecture, and a larger quantity of nodes (slave stations) indicates a larger delay. The network architecture in FIG. 7 is a parallel architecture, and a quantity of nodes (slave stations) basically does not affect an overall delay.

For the foregoing problem (2), an EtherCAT protocol fails to define a process and a frame format for communication between nodes, and therefore, does not support direct communication between nodes. The optical bus protocol defines a process and a frame format for communication between nodes, and therefore, supports direct communication between nodes.

For the foregoing problem (3), EtherCAT uses a twisted pair (copper wire) for networking. The twisted pair (copper wire) is sensitive to strong electromagnetic interference and may experience a packet loss in a severe case. In the network architecture shown in FIG. 7, different devices may be connected through an optical fiber, and are not affected by electromagnetic radiation.

For the foregoing problem (4), the serial bus architecture of EtherCAT mainly supports real-time services, and if a non-real-time ordinary service is accessed, the overall delay is increased, and real-time services are affected. A protocol and a mechanism of the optical bus-based parallel architecture ensure coexistence of real-time services and non-real-time services without affecting real-time services.

The following describes an example of a method procedure in embodiments of this application.

Figure 8:
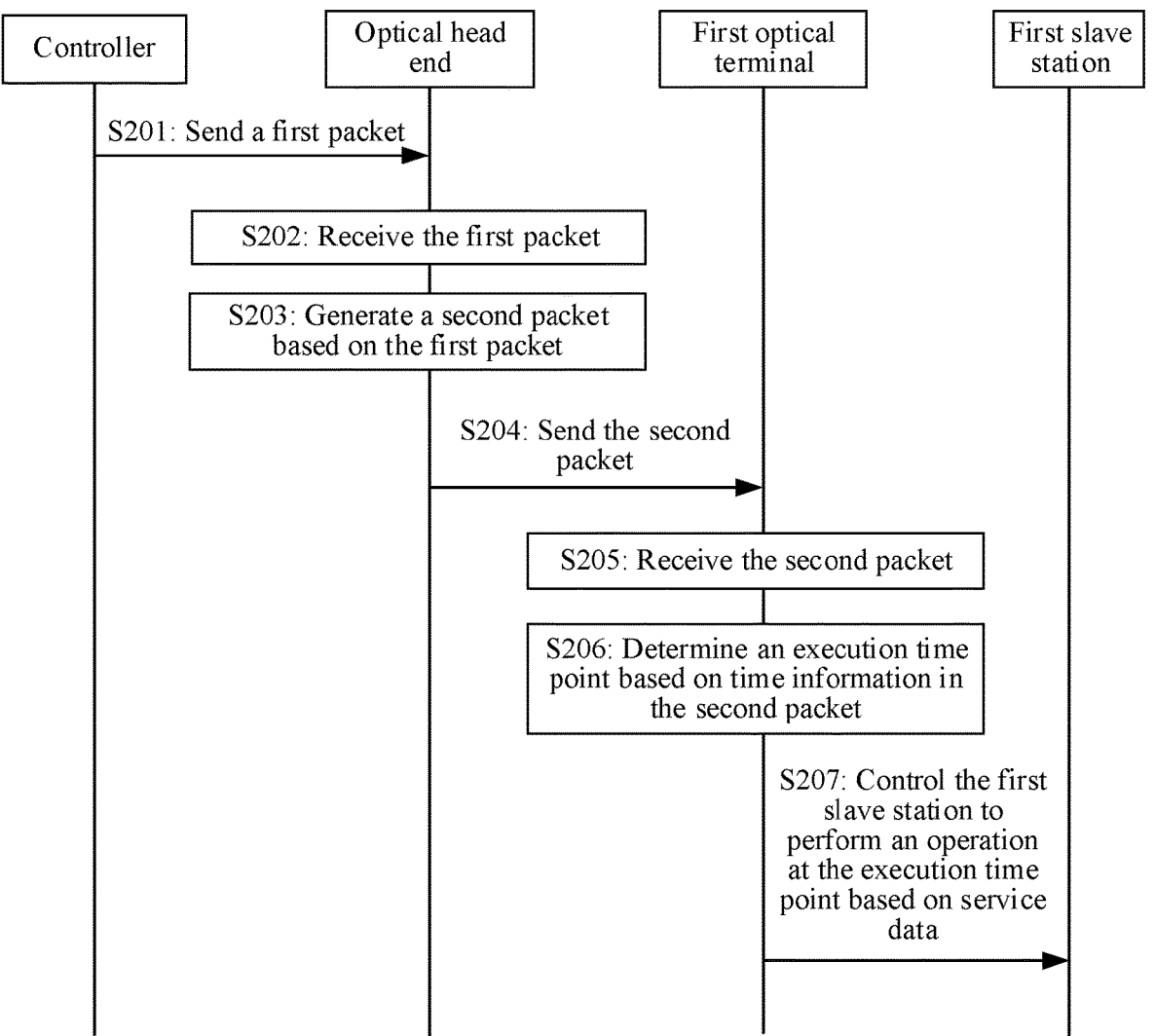
FIG. 8 is a flowchart of a clock synchronization method according to an embodiment of this application.

FIG. 8 is a flowchart of a clock synchronization method according to an embodiment of this application. The method shown in FIG. 8 includes the following step S201 to step S207.

The method shown in FIG. 8 involves a plurality of optical terminals. "First optical terminal" is used to represent one of a plurality of optical terminals.

The method shown in FIG. 8 involves a plurality of slave stations. "First slave station" is used to represent one of a plurality of slave stations.

The method shown in FIG. 8 supports a scenario in which the plurality of slave stations are controlled to simultaneously perform an operation. For ease of understanding by a reader, the method shown in FIG. 8 is described regarding how to control one slave station (the first slave station) to perform the operation. For manners of controlling other slave stations, refer to the manner of controlling the first slave station. For example, in a scenario in which there are N optical terminals and N slave stations, each of the N optical terminals controls a slave station connected thereto by using a procedure similar to that used by the first optical terminal, so that the N slave stations are controlled to simultaneously perform the operation.

The method shown in FIG. 8 is optionally based on the network deployment scenario shown in FIG. 7. For example, with reference to FIG. 7, the first optical terminal in the method shown in FIG. 8 is the optical terminal 1 in FIG. 7, and the first slave station in the method shown in FIG. 8 is the slave station 1 in FIG. 7.

Optionally, before the method shown in FIG. 8 is implemented, an optical head end, the plurality of optical terminals, and the plurality of slave stations first perform time synchronization based on a PON system, to achieve time synchronization among the three types of devices, namely, the optical head end, the optical terminals, and the slave stations. Then, the method shown in FIG. 8 is implemented, to achieve clock synchronization or time synchronization in an entire system (where the entire system includes four types of devices: a controller, the optical head end, the optical terminals, and the slave stations).

Optionally, the optical terminal and the slave station involved in the method shown in FIG. 8 may be implemented in a standalone configuration or implemented in an integrated configuration. When the optical terminal and the slave station are implemented in an integrated configuration, steps performed by the optical terminal and steps performed by the slave station are performed by a device integrating the optical terminal and the slave station.

The method shown in FIG. 8 involves packets exchanged between a plurality of devices. To distinguish between different packets, "first packet" and "second packet" are used to distinguish and describe packets sent by different devices.

The method shown in FIG. 8 involves a plurality of time points. To distinguish between different time points, "first time point" and "second time point" are used to distinguish and describe different time points.

The method shown in FIG. 8 involves a plurality of offset time. To distinguish between different offset time, "first offset time" and "second offset time" are used to distinguish and describe different offset time.

Step S201: The controller sends a first packet to the optical head end.

The first packet includes service data that is on the controller and that is to be transmitted to the plurality of slave stations. In some embodiments, the first packet is an IOB packet, a packet format of the first packet complies with a packet format in an optical bus protocol, and the first packet includes fields shown in Table 1 below.

The service data includes execution content and calculation process data. The following describes the two types of service data.

The execution content indicates an instruction of the controller to the slave stations. The execution content is used for controlling the slave stations to perform a corresponding operation. For example, the execution content indicates the slave stations to control a motor to operate a robotic arm. For another example, the execution content indicates a motor to control a Boolean value.

The calculation process data is data generated through calculation by the controller in a three-loop control operation. The calculation process data includes but is not limited to data generated by the controller during a current loop operation, data generated by the controller during a velocity loop operation, data generated by the controller during a position loop operation, and the like. For a definition of the three-loop control operation, refer to the foregoing description of the definitions of the terms.

Step S202: The optical head end receives the first packet from the controller.

Step S203: The optical head end generates a second packet based on the first packet.

Step S204: The optical head end sends the second packet to the plurality of optical terminals.

The second packet includes the service data carried in the first packet and time information. In some embodiments, the second packet is an IOB packet, a packet format of the second packet complies with a packet format in the optical bus protocol, and the second packet includes the fields shown in Table 1 below.

The time information indicates an execution time point at which the plurality of slave stations perform an operation based on the service data. The operation performed by the slave stations includes but is not limited to executing the instruction of the controller and performing a data collection operation. The following describes the time information from multiple perspectives such as an application scenario of the time information, specific content of the time information, and a carrying position of the time information in a packet.

From the perspective of the application scenario of the time information, application scenarios of the time information include but are not limited to the following scenario 1 to scenario 2.

Scenario 1: Instruction Execution

The time information is optionally used in a scenario in which the plurality of slave stations are controlled to simultaneously execute the instruction of the controller, to achieve synchronization of the instruction execution actions. Specifically, the execution time point indicated by the time information includes a first time point. The first time point is a time point at which the plurality of slave stations execute the instruction included in the service data.

Scenario 2: Data Collection

The time information is optionally used in a scenario in which the plurality of slave stations are controlled to simultaneously collect data, to achieve synchronization of the data collection actions. Specifically, the execution time point indicated by the time information includes a second time point. The second time point is a time point at which the plurality of slave stations execute the data collection operation. The second time point is later than the first time point.

Optionally, the execution time point indicated by the time information includes a combination of the first time point and the second time point. Alternatively, the execution time point indicated by the time information includes one of the first time point and the second time point.

From the perspective of the specific content of the time information, the content of the time information includes but is not limited to the following case (1) to case (3).

Case (1): The time information includes reference time and a compensation delay.

The reference time is used as a starting point of a synchronization cycle. The execution time point at which the slave stations perform the operation is obtained by adding or subtracting a specific time length (that is, the compensation delay) based on the reference time. The reference time includes but is not limited to the following case (1-1) and case (1-2).

Case (1-1): The reference time is a timestamp added by the optical head end.

In case (1-1), the reference time indicates a time point at which the optical head end receives the first packet. The reference time is specifically a timestamp of the optical head end when the optical head end receives the first byte of the first packet. A specific process of generating the second packet by the optical head end includes: The optical head end obtains the timestamp at which the optical head end receives the first byte of the first packet (that is, the reference time) and adds the timestamp and the compensation delay to the first packet sent by the controller, to obtain the second packet including the timestamp and the compensation delay. In conclusion, in the second packet sent by the optical head end, both the timestamp and the compensation delay are added by the optical head end.

In some embodiments, case (1-1) is used for supporting the following scenario: The controller and the optical head end use different clock sources. The optical head end and the plurality of optical terminals use a same clock source.

The optical head end writes, into a packet, a timestamp at which a packet from the controller is received, and transfers the packet including the timestamp to the slave stations through the optical terminals, to provide a start time point for a synchronization cycle of the entire system. Therefore, in the entire system, a time point for performing an operation is determined by using time of the optical head end as a reference, so that the operation is performed synchronously, thereby implementing clock synchronization in the entire system.

Case (1-2): The reference time is a timestamp added by the controller.

In case (1-2), the reference time indicates a time point at which the controller generates the first packet. A specific process of sending the first packet by the controller includes: The controller adds a timestamp of the controller to the first packet, and sends the first packet including the timestamp to the optical head end. A specific process of generating the second packet by the optical head end includes: The optical head end further adds the compensation delay to the first packet including the timestamp, to obtain the second packet including the timestamp and the compensation delay. In conclusion, in the second packet sent by the optical head end, the timestamp is previously added by the controller to the packet, and the compensation delay is added by the optical head end.

In some embodiments, case (1-2) is used for supporting the following scenario: The controller and the optical head end use a same clock source. The optical head end and the plurality of optical terminals use a same clock source.

The controller writes a timestamp into a packet, and transfers the packet including the timestamp to the slave stations through the optical head end and the optical terminals, to provide a start time point for a synchronization cycle of the entire system. Therefore, in the entire system, a time point for performing an operation is determined by using time of the controller as a reference, so that the operation is performed synchronously, thereby implementing time synchronization in the entire system.

The compensation delay is used for delay compensation on the reference time. The compensation delay indicates a time difference between the reference time and the execution time point. The term "compensation" includes but is not limited to two implementations: addition and subtraction. In other words, the compensation delay may be duration to be added based on the reference time, or the compensation delay may be duration to be subtracted from the reference time.

The optical head end writes a compensation delay into a packet, and transmits the compensation delay and a reference time together to the optical terminals through the packet, to provide more reference information for a process of determining a time point at which the slave stations perform an operation. This helps compensate for a delay caused by various factors such as an internal processing action of the device and an actual network environment, thereby reducing impact of the factors on time synchronization and improving time synchronization precision.

There are a plurality of types of compensation delays. In a specific example, the compensation delay includes but is not limited to any one or combination of (a) to (e) below.

(a) Dwelt Time

The dwelt duration indicates duration for which the first packet is dwelt on the optical head end. The dwelt duration is, for example, a time difference between a time point at which the optical head end generates the second packet and a time point at which the optical head end receives the first packet. A process of generating the second packet includes encapsulating the first packet into a GPON transmission convergence (GTC) frame. The time point at which the second packet is generated is, for example, a time point at which the first byte of the first packet is encapsulated into the GTC frame. The dwelt duration is, for example, determined and added to the packet by the optical head end. A relationship between the dwelt duration, the reference time, and the execution time point is, for example, that the execution time point is obtained by subtracting the dwelt duration from the reference time.

The consideration of the dwelt duration in the synchronization process helps compensate for a delay caused by a packet staying in the optical head end and waiting for processing by the optical head end, thereby improving the time synchronization precision.

(b) Equalization Delay

For a basic principle of determining the equalization delay, refer to the foregoing description of the definitions of the terms. As used in the scenarios of this embodiment, the equalization delay indicates a transmission delay between a farthest optical terminal and the optical head end. The farthest optical terminal is the optical terminal farthest from the optical head end among the plurality of optical terminals. A relationship between the equalization delay, the reference time, and the execution time point is, for example, that the execution time point is obtained by adding the reference time and the equalization delay.

For example, a process of determining the equalization delay includes: The optical head end performs ranging on the plurality of optical terminals to obtain a logical distance between each of the plurality of optical terminals and the optical head end. The optical head end determines an equalization delay of each optical terminal based on the logical distance of each optical terminal. The optical terminal determines, from the equalization delays of the plurality of optical terminals, a maximum equalization delay as an equalization delay to be used for determining the execution time point of the slave station in the synchronization process.

The consideration of the equalization delay in the synchronization process avoids impact of inconsistent distances between the optical terminals and the optical head end on time synchronization, thereby improving the time synchronization precision.

(c) First Offset Time

The first offset duration indicates duration required by a slave station with a lowest processing speed among the plurality of slave stations to process the service data. For example, the first offset duration is a maximum value of processing time lengths of the plurality of slave stations. A relationship between the first offset duration, the reference time, and the execution time point is, for example, that the execution time point is obtained by adding the reference time and the first offset duration.

The consideration of the first offset duration in the synchronization process avoids impact caused by inconsistent data processing time of the slave stations, allowing all the slave stations to execute the instruction simultaneously.

(d) Second Offset Time

The second offset duration indicates duration required by the slave station with the slowest processing speed to proceed from executing the instruction of the controller to starting the data collection operation. A relationship between the second offset duration, the reference time, and the execution time point is, for example, that the execution time point is obtained by adding the reference time and the second offset duration.

The consideration of the second offset duration in the synchronization process to compensate for a processing time of each slave station avoids impact caused by inconsistent processing time of the slave stations on time synchronization, allowing all the slave stations to collect data simultaneously.

(e) Transmission Delay

The transmission delay indicates a delay of transmitting the first packet from the controller to the optical head end. For example, the transmission delay is a time difference between the time point at which the optical head end receives the first packet and a time point at which the controller sends the first packet. A relationship between the transmission delay, the reference time, and the execution time point is, for example, that the execution time point is obtained by adding the reference time and the transmission delay.

The consideration of the transmission delay in the synchronization process to compensate for a delay caused by transmission of the packet from the controller to the optical head end avoids impact of the delay on time synchronization, thereby improving the time synchronization precision.

Case (2): The time information includes the reference time.

In case (2), a compensation delay is optional content in the second packet. In other words, the second packet optionally carries the reference time, and does not carry the compensation delay. Specifically, this embodiment supports use of some technical means to enable the optical terminal to perceive the compensation delay in advance before the synchronization process, so that the compensation delay does not need to be transferred to the optical terminal through a packet carrying the reference time, thereby avoiding overheads caused by transferring the compensation delay in each synchronization cycle. An occasion at which the optical terminal perceives the compensation delay is implemented in, for example, an initialization phase (for example, when the optical terminal goes online for the first time). A specific implementation of perceiving the compensation delay by the optical terminal includes but is not limited to the following manner 1 to manner 2.

Manner 1: Static Configuration

Specifically, any one or combination of the foregoing compensation delays may be used as a configuration item of the optical terminal. Network management personnel preset the compensation delays, and configures the compensation delays for the plurality of optical terminals through a command line or a web interface.

Manner 2: Measurement

In a process of measuring the first offset duration, each slave station measures duration required for the slave station to process the service data. Each slave station sends the processing time length to the optical head end through the optical terminal. After receiving the processing time length sent by each slave station, the optical head end determines, from the processing time lengths of the plurality of slave stations, a maximum processing time length as the first offset duration. A process of measuring the second offset duration is similar to the process of measuring the first offset duration. For a process of measuring the equalization delay, refer to the foregoing description of the equalization delay.

After the optical head end obtains the compensation delay through measurement, the optical head end sends the compensation delay to the plurality of optical terminals. Each of the plurality of optical terminals receives the compensation delay. In this way, in the subsequent synchronization process, each optical terminal determines the execution time point based on the reference time carried in the packet and the compensation delay measured in advance.

Case (3): The time information includes the execution time point calculated based on the reference time and the compensation delay.

In case (3), a task of calculating the execution time point is executed by the optical head end, and the time information in the packet sent by the optical head end is the calculated execution time point. Specifically, a specific process of generating the second packet by the optical head end includes: The optical head end obtains a timestamp carried in the first packet, or obtains a timestamp at which the optical head end receives a first byte of the first packet, and uses the timestamp as the reference time. The optical head end determines the execution time point based on the reference time and the compensation delay. The optical head end adds the execution time point to the first packet sent by the controller, to obtain the second packet including the execution time point.

The optical head end calculates the time point at which the slave stations perform the operation, writes the time point at which the slave stations perform the operation into a packet, and transfers the packet to the slave stations through the optical terminals. Therefore, the optical terminals do not need to separately perform a task of calculating the time point, and an advantage of the optical head end in computing performance is more fully utilized, thereby improving overall synchronization efficiency and resource utilization of the system.

From the perspective of the carrying position of the time information in the packet, the carrying position of the time information includes but is not limited to the following carrying position (1) to carrying position (2).

Carrying position (1): The time information is carried in a timestamp field of the second packet.

With the use of the timestamp field to carry information related to the time point at which the slave stations perform the operation, a packet format in this solution is more compatible with an existing packet format in an optical bus protocol, thereby reducing implementation complexity.

Carrying position (2): The time information is carried in a protocol data unit (PDU) field of the second packet.

For example, refer to the following Table 1. Table 1 shows a frame format of an optical bus link layer frame. The second packet has the frame format shown in Table 1. Table 1 shows a 4-byte timestamp field and a variable-length PDU field. The timestamp field and the PDU field are optionally used for carrying the time information.

TABLE 1

| Field name | Field length (byte) | Field definition |
|---|---|---|
| Destination address (DA) | 6 | Destination media access control (MAC) address |
| Source address (SA) | 6 | Source MAC address |

TABLE 1-continued

| Field name | Field length (byte) | Field definition |
|---|---|---|
| EtherType | 2 | Ethernet type |
| PDUn | 12-1978 | The protocol data unit n is an integer greater than or equal to 0. |
| Timestamp (Optional) | 4 | Timestamp (optional). An uplink packet indicates a time point at which a process data object (PDO) performs an operation. A downlink packet indicates a start time point of a PDO data cycle. Unit: 6.4 ns, indicating a deviation in current 10 s. For duration that is not an integer multiple of 10 s, padding is performed by software. Whether this field is included is identified by t_ind in the PDU. |
| Frame check sequence (FCS) | 4 | Frame check sequence |

With the use of the PDU field to carry information related to the time point at which the slave stations perform the operation, more bytes can be used to carry richer information, thereby improving flexibility.

Optionally, all content included in the time information is carried in the timestamp field, or all content included in the time information is carried in the PDU field. Alternatively, a part of content included in the time information is carried in the timestamp field, and the other part of content is carried in the PDU field. For example, the reference time is carried in the timestamp field, and the compensation delay is carried in the PDU field.

Step S205: The first optical terminal receives the second packet.

Step S206: The first optical terminal determines the execution time point based on the time information in the second packet.

A manner in which the first optical terminal determines the execution time point includes but is not limited to the following manner A to manner B.

Manner A: The first optical terminal obtains the reference time from the second packet, and the first optical terminal determines the execution time point based on the reference time and the compensation delay.

Optionally, the first optical terminal obtains the compensation delay from the second packet. Alternatively, the first optical terminal obtains the compensation delay in advance through configuration or measurement.

Manner B: The first optical terminal uses a time point indicated by the time information carried in the second packet as the execution time point.

Specifically, when the execution time point is calculated by the optical head end, the time information carried in the second packet sent by the optical head end is the calculated execution time point. The first optical terminal can obtain the execution time point from a field of the second packet, and does not need to calculate the execution time point based on the reference time and the compensation delay.

Step S207: The first optical terminal controls the first slave station to perform the operation at the execution time point based on the service data.

In some embodiments, a function of controlling the slave station by the optical terminal is specifically implemented by generating a synchronization signal. The synchronization signal is similar to an interrupt signal, and the synchronization signal is used for triggering the slave station to start the operation based on the service data. Specifically, the first optical terminal starts a timer, and when the execution time point is reached, the first optical terminal generates the synchronization signal. The first optical terminal sends the synchronization signal to the first slave station. When receiving the synchronization signal, the first slave station performs the operation based on the service data.

An occasion at which the service data is transmitted from the optical terminal to the slave station includes many cases. In some embodiments, the service data is sent to the slave station before the synchronization signal. For example, after the first optical terminal receives the second packet, the first optical terminal sends the service data carried in the second packet to the first slave station. Then, when the execution time point is reached, the first optical terminal sends the synchronization signal to the slave station. In some other embodiments, the service data and the synchronization signal are sent to the slave station at the same time. For example, after the first optical terminal receives the second packet, the first optical terminal caches the service data carried in the second packet. Then, when the execution time point is reached, the first optical terminal sends the synchronization signal and the service data to the first slave station.

Corresponding to the application scenarios of the time information, step S207 includes but is not limited to at least one of the following manner 1 and manner 2.

Manner 1: The first optical terminal controls the first slave station to execute the instruction included in the service data at the first time point.

Specifically, when the first time point is reached, the first optical terminal generates a synchronization signal Sync0 (where sync is an acronym of synchronize). The first optical terminal sends the synchronization signal Sync0 to the first slave station. When the first slave station receives the synchronization signal Sync0, the first slave station executes the instruction included in the service data. The synchronization signal Sync0 is used for triggering the slave station to start to execute the instruction included in the service data.

The foregoing manner 1 supports the instruction execution scenario, allowing the plurality of slave stations in the system to execute the instruction from the controller simultaneously.

Manner 2: The first optical terminal controls the first slave station to perform the data collection operation at the second time point.

Specifically, when the second time point is reached, the first optical terminal generates a synchronization signal Sync1. The first optical terminal sends the synchronization signal Sync1 to the first slave station. When the first slave station receives the synchronization signal Sync1, the first slave station performs the data collection operation. The synchronization signal Sync1 is used for triggering the slave station to start the data collection operation.

The foregoing manner 2 supports the collection and reporting scenario, allowing the plurality of slave stations in the system to collect data simultaneously.

The foregoing describes, through steps S205 to S207, how to use the time information in the packet sent by the optical head end to enable the first optical terminal to control the first slave station to perform the operation at the execution time point based on the service data. By analogy, each of the plurality of optical terminals performs a procedure similar to that performed by the first optical terminal, and each of the plurality of slave stations performs a procedure similar to that performed by the first slave station, so that the plurality of slave stations are controlled to perform the operation at the execution time point based on the service data.

This embodiment provides a method for supporting clock synchronization in an industrial optical bus network. In the method, an optical head end and a plurality of optical terminals transfer service data exchanged between a controller and a plurality of slave stations, and a packet sent by the optical head end to the plurality of optical terminals carries information related to a time point at which the slave stations perform an operation, to indicate the plurality of slave stations to perform the operation at the time point. In this way, the plurality of slave stations in a system perform the operation at the same time point, thereby implementing clock synchronization. The method meets a clock synchronization requirement due to introduction of optical communication into an industrial field bus, and is applicable to a system architecture based on optical bearer service data. In this way, limitations of related technologies are resolved to some extent.

The foregoing describes a downlink interaction procedure from the controller to the slave station, and the following briefly describes an uplink interaction procedure from the slave station to the controller. Each of the plurality of slave stations performs the data collection operation at the second time point to obtain collected data. Each of the plurality of slave stations sends the collected data to the optical terminal associated with the slave station. The plurality of optical terminals separately receive the collected data sent by the plurality of slave stations. The plurality of optical terminals send the collected data to the optical head end. The optical head end receives the collected data sent by the plurality of optical terminals, and the optical head end sends the collected data to the controller. For example, for the first optical terminal and the first slave station, the first slave station performs the data collection operation to obtain collected data, and the first slave station sends the collected data to the first optical terminal. The first optical terminal receives the collected data sent by the first slave station, and the first optical terminal sends the collected data to the optical head end.

The foregoing embodiments are described below with reference to two specific examples.

In the following two specific examples, specific example 1 corresponds to the foregoing case (1-1), and specific example 2 corresponds to the foregoing case (1-2). In the following two specific examples, a PLC is an example of the controller in the method shown in FIG. 8. In the following two specific examples, any time-related information in the packet sent by the optical head end is an example of the time information in the method shown in FIG. 8. In the following two specific examples, $T_0$ is an example of the reference time (timestamp) in the method shown in FIG. 8. In the following two specific examples, $T_{dwell}$ is an example of the dwelt duration in the method shown in FIG. 8. In the following two specific examples, $T_{eqd}(\max)$ is an example of the equalization delay in the method shown in FIG. 8. In the following two specific examples, $T_{Offset0}$ is an example of the first offset duration in the method shown in FIG. 8. In the following two specific examples, $T_{Offset1}$ is an example of the second offset duration in the method shown in FIG. 8. In the following two specific examples, $\Delta t$ is an example of the transmission delay in the method shown in FIG. 8. In the following two specific examples, an IOB packet sent by the PLC is an example of the first packet in the method shown in FIG. 8. In the following two specific examples, an IOB packet sent by the optical head end is an example of the second packet in the method shown in FIG. 8.

In the following two specific examples, a synchronization signal Sync0 and a synchronization signal Sync1 are both examples of the synchronization signal in the method shown in FIG. 8.

In the following two specific examples, $T_{Sync0}$ and $T_{Sync1}$ are both examples of the execution time point in the method shown in FIG. 8. $T_{Sync0}$ is an example of the first time point in the method shown in FIG. 8. $T_{Sync1}$ an example of the second time point in the method shown in FIG. 8. In the following two specific examples, execution content and calculation process data are examples of the service data in the method shown in FIG. 8.

Specific Example 1 (where the PLC and the Optical Head End Use Different Clock Sources)

When system clock synchronization cannot be implemented through an interface such as a PCIE interface or an Ethernet interface between the PLC and the optical head end and no additional hardware pin is provided between the PLC and the optical head end to support a hardware I/O interrupt and input following of an echo clock cannot be supported, the optical head end follows a periodic packet of the PLC by using a method in specific example 1, to implement periodic synchronization between systems.

Figure 9:
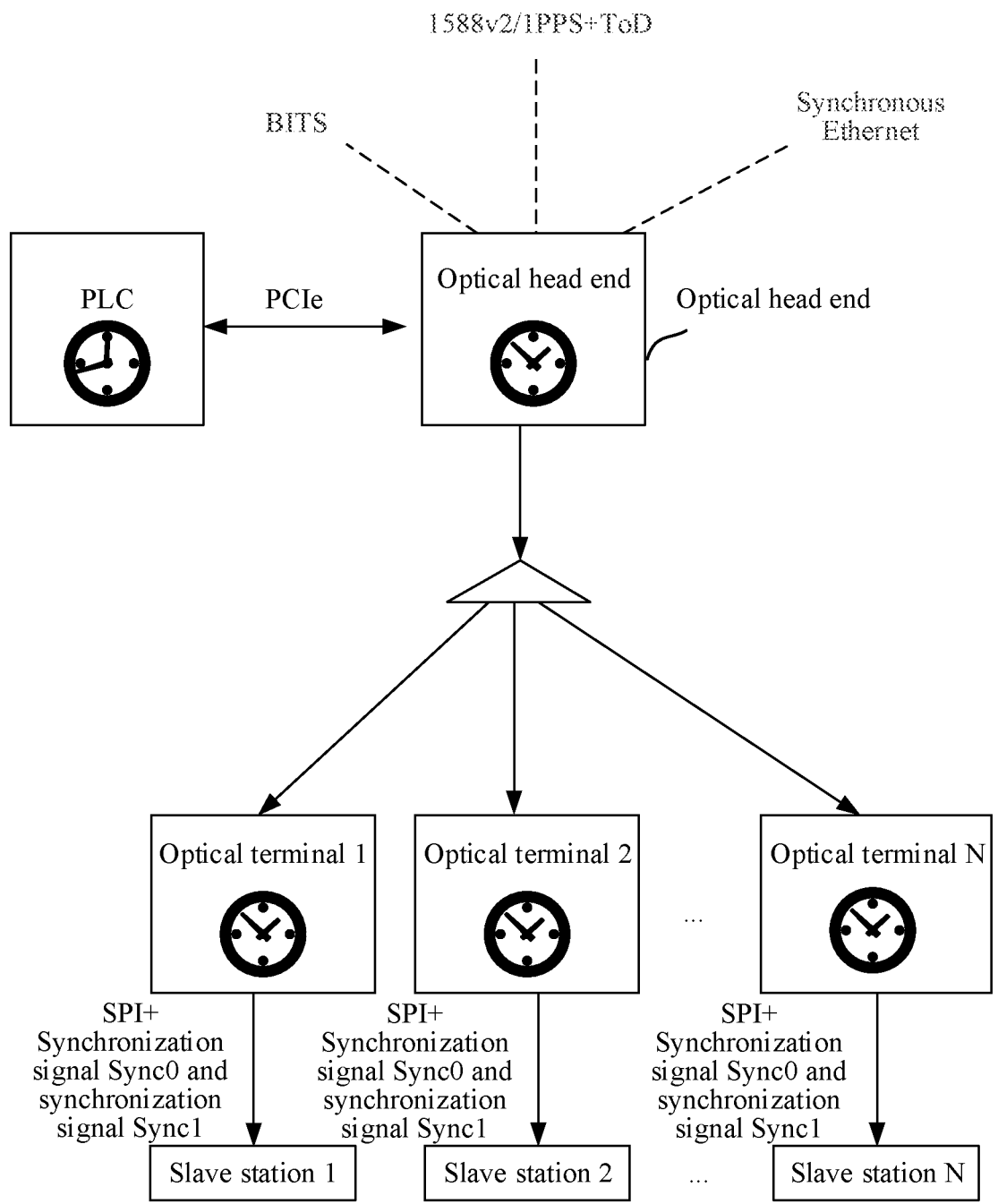
FIG. 9 is a schematic diagram of optical bus networking in a case of different clock sources according to an embodiment of this application.

FIG. 9 is a schematic diagram of optical bus networking in a case of different clock sources. In the networking shown in FIG. 9, the PLC is configured to initiate a communication command and the periodic packet. The PLC is a programmable logic controller that implements programming and management of an industrial control module, and usually has a CPU module to perform arithmetic processing, communication processing, and other functions. The optical head end and the optical terminals function as a communication channel between the PLC and the slave stations to transfer information exchanged between the PLC and the slave stations. The optical head end is specifically configured to implement bearer and reuse of a bus service/Ethernet service in a point-to-multipoint communication system. The optical terminal is specifically configured to implement a function of obtaining industrial control information or Ethernet information in the point-to-multipoint system. The slave station is configured to receive the periodic packet, execute an instruction, and report collected data.

As shown in FIG. 9, the PLC and the optical head end use different clock sources.

Specific example 1 includes the following step S41 to step S46.

Step S41: In a system initialization phase, the optical head end and the optical terminals implement clock synchronization based on a PON system; the optical head end records an equalization delay $T_{eqd}$ of each optical terminal; and the optical head end calculates a maximum equalization delay $T_{eqd}(\text{max})$ among all the optical terminals.

Optionally, the optical head end sends $T_{eqd}(\text{max})$ to each optical terminal in the initialization phase. Therefore, in a subsequent synchronization process, $T_{eqd}(\text{max})$ does not need to be carried in a downlink IOB packet. Alternatively, the optical head end sends $T_{eqd}(\text{max})$ to each optical terminal through a downlink IOB packet in the synchronization process.

Step S42: The PLC periodically delivers an IOB packet.

Step S43: Each time the optical head end receives the first byte of an IOB packet sent by the PLC, the optical head end records a current time point $T_0$. The optical head end adds time information related to $T_0$ to the IOB packet sent by the PLC. The time information added by the optical head end is specifically $(T_0, T_{dwelt})$ or $(T_0-T_{dwelt})$, $T_{eqd}(\text{max})$, $T_{Offset0}$, and $T_{Offset1}$. The optical head end sends the IOB packet including $(T_0, T_{dwelt})$ or $(T_0-T_{dwelt})$, $T_{eqd}(\text{max})$, $T_{Offset0}$, and $T_{Offset1}$ $(T_0, T_{dwelt})$ or $(T_0-T_{dwelt})$, $T_{eqd}(\text{max})$, $T_{Offset0}$, and $T_{Offset1}$ to the optical terminals.

For a carrying position of $(T_0, T_{dwelt})$ or $(T_0-T_{dwelt})$, $T_{eqd}(\text{max})$, $T_{Offset0}$, and $T_{Offset1}$ in the IOB packet, there are a plurality of manners. Three manners are described below by way of example.

Manner 1: A timestamp field is used to carry $(T_0, T_{dwelt})$ or $(T_0-T_{dwelt})$, $T_{eqd}(\text{max})$, $T_{Offset0}$, and $T_{Offset1}$. In other words, the optical head end adds $(T_0, T_{dwelt})$ or $(T_0-T_{dwelt})$, $T_{eqd}(\text{max})$, $T_{Offset0}$, and $T_{Offset1}$ to the timestamp field of the IOB packet.

Manner 2: The optical head end adds $(T_0, T_{dwelt})$ or $(T_0-T_{dwelt})$, $T_{eqd}(\text{max})$, $T_{Offset0}$, and $T_{Offset1}$ to a PDU field of the IOB packet.

For example, refer to Table 1. Table 1 shows the frame format of the optical bus link layer frame (that is, the IOB packet). The frame format shown in Table 1 includes one or more PDU fields, and the PDU field may be used to carry the time information.

Manner 3: The optical head end adds a part of the time information including $(T_0, T_{dwelt})$ or $(T_0-T_{dwelt})$, $T_{eqd}(\text{max})$, $T_{Offset0}$, and $T_{Offset1}$ to the timestamp field, and adds the other part of the time information to the PDU field. For example, the optical head end adds $(T_0, T_{dwelt})$ or $(T_0-T_{dwelt})$ to the timestamp field, and adds $T_{eqd}(\text{max})$, $T_{Offset0}$, and $T_{Offset1}$ to the PDU field.

In some embodiments, the optical head end encapsulates the IOB packet into a GTC frame, and sends the GTC frame to the optical terminals. The GTC frame includes a GTC frame header and a GTC payload field. The GTC frame header is generated by the optical head end. The GTC payload field includes main fields of the IOB packet (for example, fields in the IOB packet other than a preamble and a frame start delimiter). The GTC payload field includes $(T_0, T_{dwelt})$ or $(T_0-T_{dwelt})$, $T_{eqd}(\text{max})$, $T_{Offset0}$, and $T_{Offset1}$. The GTC frame sent by the optical head end is a broadcast frame, and the GTC frame is broadcast to all the optical terminals connected to the optical head end.

Step S44: Each optical terminal receives the IOB packet sent by the optical head end, and each optical terminal obtains, from the IOB packet, execution content, calculation process data, and $(T_0, T_{dwelt})$ or $(T_0-T_{dwelt})$, $T_{eqd}(\text{max})$, $T_{Offset0}$, and $T_{Offset1}$ added by the optical head end. Each optical terminal separately determines a time point $T_{Sync0}$ and a time point $T_{Syn1}$ based on $(T_0, T_{dwelt})$ or $(T_0-T_{dwelt})$, $T_{eqd}(\text{max})$, $T_{Offset0}$, and $T_{Offset1}$ by using the following formula (1) and formula (2).

$$T_{Sync0}=T_0-T_{dwelt}+T_{eqd}(\text{max})+T_{Offset0} \qquad \text{formula (1)}$$

$$T_{Sync1}=T_{Sync0}+T_{Offset1} \qquad \text{formula (2)}$$

$T_{Sync0}$ in formula (1) represents a time point at which the slave station executes the instruction (the first time point). $T_{Sync1}$ in formula (2) represents a time point at which the slave station performs the data collection operation (the second time point).

Step S45: When the time point $T_{Sync0}$ is reached, the optical terminal generates a synchronization signal Sync0 (similar to an interrupt). The slave station receives the synchronization signal Sync0, and executes corresponding instruction based on the execution content obtained from the optical terminal.

Specifically, the optical terminal receives the packet sent by the optical head end. After the optical terminal parses the packet, the optical terminal writes the execution content carried in the packet into a local dual-port random access memory (RAM) of the optical terminal. Based on an indication of an SM Event signal, the slave station reads the execution content from the dual-port RAM of the optical terminal through the interface, and stores the execution content in a local RAM of the slave station. The slave station executes the instruction based on an indication of the signal Sync0.

Step S46: After the synchronization signal Sync0 is triggered, when the time point $T_{Sync1}$ is reached after a delay of a period of time (that is, $T_{Offset1}$), the optical terminal generates a synchronization signal Sync1 (similar to an interrupt). After receiving the synchronization signal Sync1, the slave station performs the data collection operation and reports collected data to the PLC. The collected data reported by the slave station is forwarded by the optical terminal and the optical head end to the PLC.

Specifically, based on an indication of the synchronization signal Sync1, the slave station performs the data collection operation, and writes to-be-reported content into the local dual-port RAM of the optical terminal through an interface. The data collection operation includes a passive response manner and an active reporting manner.

For the passive response manner, when the optical terminal receives, in a downlink direction of an optical link, a packet that belongs to the slave station connected to the optical terminal, the optical terminal reads the collected data reported by the slave station from the dual-port RAM, and places the collected data reported by the slave station into the packet being currently processed. After the processing is complete, the optical terminal returns the packet carrying the collected data to the optical head end in an uplink direction of the optical link. The optical head end further returns the packet carrying the collected data to the PLC, so that the PLC processes the packet.

For the active reporting manner, after an uplink report slot for the slave station corresponding to the optical terminal is reached, the optical terminal reads the collected data reported by the slave station from the dual-port RAM, and constructs an uplink packet including the collected data. After the processing is complete, the optical terminal returns the packet including the collected data to the optical head end in an uplink direction of the optical link. The optical head end further returns the packet to the PLC for processing.

The following describes physical meanings and functions of various parameters added by the optical head end in specific example 1.

(1) $T_0$ $T_0$ is a timestamp added by the optical head end. $T_0$ indicates a moment at which the optical head end receives the first byte of each JOB packet.

An effect of adding $T_0$ by the optical head end is as follows: Considering that the PLC and the optical head end/optical terminals use different time sources and the optical head end and the optical terminals use a same time source, to allow the optical terminals to have a start time reference for execution of Sync0 or Sync1, the optical head end adds $T_0$, so that each optical terminal uses $T_0$ as a start reference for a generation time point of Sync0 or Sync1.

(2) $T_{dwelt}$ $T_{dwelt}$ indicates duration for which the packet is dwelt on the optical head end. $T_{dwelt}$=Actual filling time−Packet arrival time.

An effect of adding $T_{dwelt}$ by the optical head end is as follows: When the optical head end encapsulates the JOB packet, a remaining quantity of bytes in the GTC frame may be less than a length of the current JOB frame to be encapsulated, and the encapsulation cannot be performed immediately. In this case, the IOB packet needs to be dwelt on the optical head end for a period of time until the first byte of the IOB packet is encapsulated into the GTC frame. The dwelt duration $T_{dwelt}$ is added by the optical head end as a timestamp value into a timestamp carried in the current JOB. The dwelt duration is compensated for subsequently.

Figure 10:
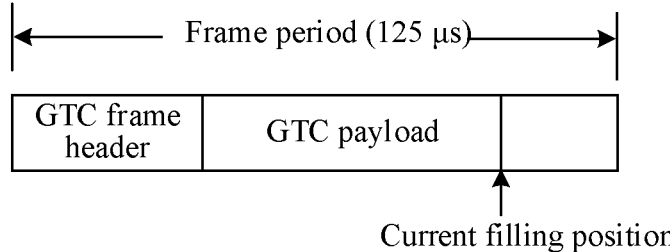
FIG. 10 is a schematic diagram of dwelt duration according to an embodiment of this application.
Figure 10:
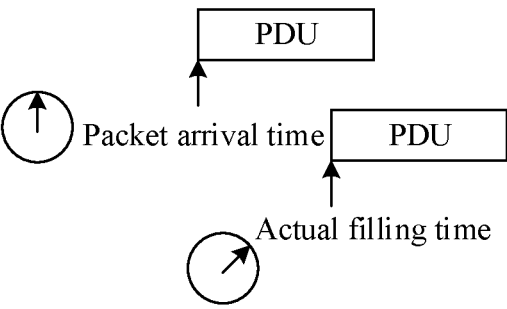

For example, refer to FIG. 10. 125 µs indicates that a frame period of the GTC frame is 125 microseconds, in other words, duration of each GTC frame is 125 microseconds. The GTC frame header carries some description information of the GTC frame. The GTC frame header is followed by the GTC payload field. Time corresponding to a payload between the GTC frame and a current filling position has elapsed and cannot be used any longer. In an ideal case, one cycle time is 125 microseconds. However, due to the existence of the dwelt duration, an actual cycle time is longer than the ideal cycle time, and a difference between the two is the dwelt duration. For example, if the dwelt duration of the packet on the optical head end is m microseconds, the actual cycle time is approximately (125+ m) microseconds. The optical head end adds the dwelt duration $T_{dwelt}$ into the packet, so that the optical terminal or the slave station subtracts the dwelt duration $T_{dwelt}$ from the timestamp $T_0$, to compensate for a delay caused by the packet dwelt on the optical head end, thereby avoiding impact caused by the dwelt duration, and improving synchronization precision.

(3) $T_{eqd}$ $T_{eqd}$ indicates the equalization delay, to be specific, a one-way delay compensation amount for downlink equalization of the optical terminal (corresponding to distance differences between different optical terminals). $T_{eqd}(max)$ indicates a maximum value of one-way delay compensation amounts of downlink equalization for all optical terminals.

Based on a principle of a ranging technology, an effect of $T_{eqd}(max)$ is to avoid impact caused by distance differences between the optical terminals and enable all the optical terminals to send packets at a same logical distance.

(4) $T_{Offset0}$ $T_{Offset0}$ indicates offset time 0. $T_{Offset0}$ is mainly determined by a time required for each optical terminal to extract data of the slave station connected to the optical terminal from the IOB frame and write the data into a dual-port RAM configured to exchange data between the optical terminal and the slave station, and a time required for the slave station to fetch the data.

Delaying the triggering of $T_{Sync0}$ by $T_{Offset0}$ can avoid impact caused by inconsistent data processing time of the slave stations, and ensures that synchronization signals Sync0 of all the slave stations are simultaneously triggered, thereby ensuring that all the slave stations execute the instruction simultaneously.

The following analyzes the principle of achieving the above effect using $T_{Offset0}$.

It can be learned from formula (1) that $T_0$, $T_{dwelt}$, and $T_{eqd}(max)$ are the same for each optical terminal, and a value of $T_{Offset0}$ is determined by the processing time of each optical terminal and the processing time of each slave station based on the foregoing description. Because the optical terminals and the slave stations perform different operations (for example, some slave stations are configured to control a motor to operate a robotic arm, and some slave stations are configured to control a Boolean value), lengths of data to be processed by the optical terminals and the slave stations are different. This may lead to different $T_{Offset0}$. A maximum $T_{Offset0}$ in the system needs to be found and used in the formula calculation. $T_0$ be specific, optical terminal and slave stations having a high processing speed need to wait for slave stations having a low processing speed to complete the data processing, and then synchronization signals Sync0 are generated at the same time. The synchronization signals Sync0 indicate the slave stations to execute the instruction simultaneously.

(5) $T_{Offset1}$ $T_{Offset1}$ indicates offset time 1. $T_{Offset1}$ is mainly determined by a time required for each slave station to switch from instruction execution to data collection.

Delaying the triggering of $T_{Sync1}$ by $T_{Offset1}$ can compensate for the processing time of each slave station to ensure that synchronization signals Sync1 of all the slave stations are triggered simultaneously, thereby ensuring that slave stations having different processing speeds collect data simultaneously.

Figure 11:
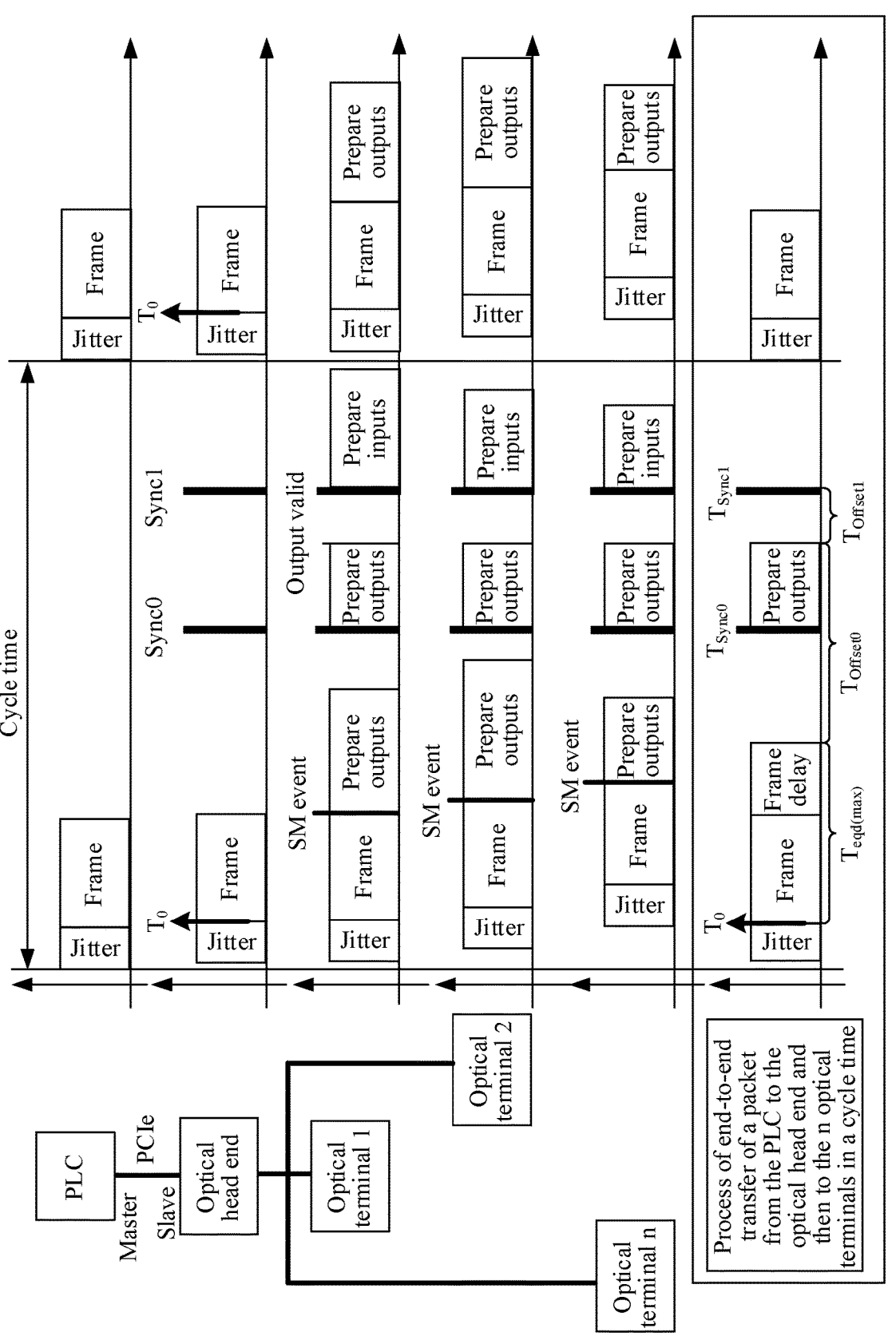
FIG. 11 is a schematic diagram of clock synchronization in a scenario of different clock sources according to an embodiment of this application.

FIG. 11 is a schematic diagram of clock synchronization in a scenario in which the PLC and the optical head end use different clock sources. FIG. 11 shows an end-to-end transfer process of a packet from the PLC to the optical head end and then to N optical terminals in a cycle time. Meanings of terms and concepts in FIG. 11 are as follows:

Sync manager event (SM Event) is a signal triggered when a downlink data frame arrives at the slave station and transmission is complete.

Prepare outputs includes a process performed by the slave station in the downlink direction and a process of the slave station performed by the uplink direction. In the downlink direction, the slave station reads the execution content from the dual-port RAM through the interface based on an indication of the signal SM Event, and puts the execution content into the local RAM of the slave station. In the uplink direction, the slave station allows a master station to fetch the collected data that has been stored in advance in the dual-port RAM of the slave station. An entire downlink and uplink process is "prepare outputs".

Output valid refers to time when the slave station enables service data, such as the execution content and the calculation process data that have been stored in the local RAM, to take effect, after an operation of triggering the synchronization signal Sync0 is performed.

Prepare inputs is a process in which when the slave station receives triggering by the synchronization signal Sync1, the slave station starts a data collection action and stores the collected data to the local dual-port RAM of the optical terminal.

Frame delay is a delay time of the periodic packet from the optical head end (in a scenario of different clock sources) or the PLC (in a scenario of a same clock source) to the slave station.

Jitter is a time deviation of significant instantaneous changes of a digital signal in a short period of time relative to an ideal position. The significant changes include a rising edge, a falling edge, and the like of the signal.

Synchronization signal Sync0 may be considered as an interrupt signal and is used for instructing the slave station to start executing the instruction, to ensure that all the slave stations perform the operation simultaneously.

Synchronization signal Sync1 may be considered as an interrupt signal, and is used for instructing the slave station to start collecting data, to ensure that all slave stations collect data simultaneously.

The foregoing describes a possible implementation procedure of specific example 1. In specific example 1, the calculation of $T_{Sync0}$ and $T_{Sync1}$ by the optical terminal is optional. Alternatively, the optical head end is responsible for calculating $T_{Sync0}$ and $T_{Sync1}$. Specifically, step S43 may be replaced with the following step S43', and step S44 may be replaced with the following step S44'.

Step S43': Each time the optical head end receives one IOB packet sent by the PLC, the optical head end records a current time point to obtain $T_0$, and the optical head end determines $T_{Sync0}$ and $T_{Sync1}$ based on $T_0$, $T_{dwelt}$, $T_{eqd}$(max), $T_{Offset0}$, and $T_{Offset1}$ by using the foregoing formula (1) and formula (2). The optical head end adds $T_{Sync0}$ and $T_{Sync1}$ to the IOB to packet, and sends the IOB packet including $T_{Sync0}$ and $T_{Sync1}$ each optical terminal.

For a carrying position of $T_{Sync0}$ and $T_{Sync1}$ the IOB packet, there are a plurality of manners. Three manners are described below by way of example.

Manner 1: The optical head end adds $T_{Sync0}$ and $T_{Sync1}$ to the timestamp field of the IOB packet.

Manner 2: The optical head end adds $T_{Sync0}$ and $T_{Sync1}$ to the PDU field of the IOB packet.

Manner 3: The optical head end adds one of $T_{Sync0}$ and $T_{Sync1}$ to the timestamp field, and adds the other to the PDU field.

Step S44': Each optical terminal receives the IOB packet sent by the optical head end, and obtains, from the IOB packet, the service data and $T_{Sync0}$ and $T_{Sync1}$ added by the optical head end.

Specific Example 2 (where the PLC and the Optical Head End Use a Same Clock Source)

An application scenario of specific example 2 is that the PLC and the optical head end use the same clock source, and the optical head end and the optical terminals use a same time source. In other words, the PLC and the optical head end are synchronous.

A more specific application scenario of specific example 2 is that system clock synchronization can be implemented through an interface such as a PCIE interface or an Ethernet interface between the PLC and the optical head end, that an additional hardware pin is provided between the PLC and the optical head end to support a hardware I/O interrupt and input following of an echo clock; or that the PLC and the optical head end share a processor. In other words, when the PLC and the optical head end use the same clock source, strict clock and time synchronization can be implemented through the PON system.

Figure 12:
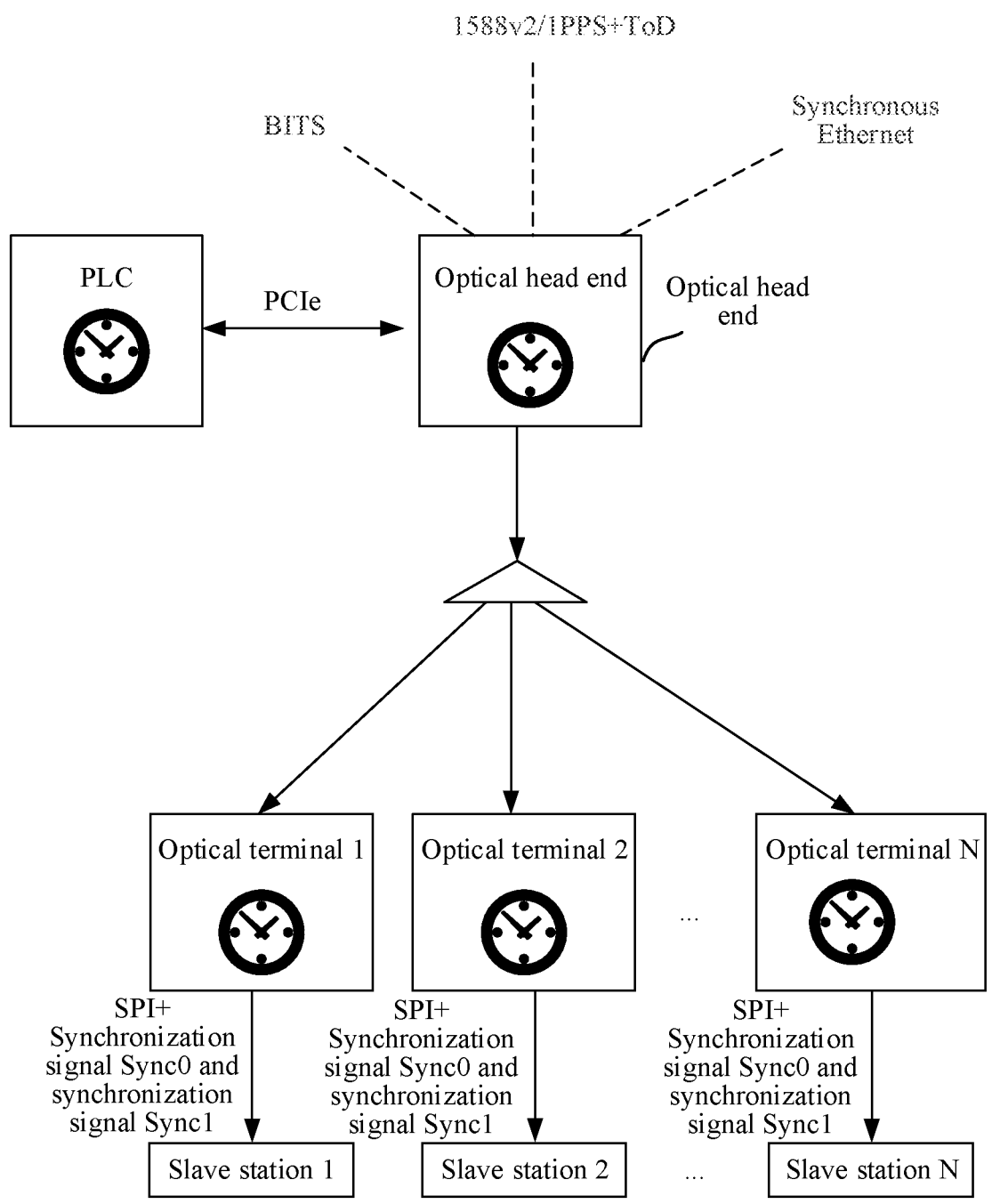
FIG. 12 is a schematic diagram of optical bus networking in a case of a same clock source according to an embodiment of this application.

FIG. 12 is a schematic diagram of optical bus networking when the PLC and the optical head end use the same clock source.

Specific example 2 includes the following step S61 to step S66. For same or similar parts between specific example 2 and specific example 1, reference may be made to each other. Specific example 2 focuses on a difference from specific example 1.

Step S61: In a system initialization phase, the optical head end and the optical terminals implement clock synchronization based on a PON system; the optical head end records an equalization delay $T_{eqd}$ of each optical terminal; and the optical head end calculates a maximum equalization delay $T_{eqd}$(max) among all the optical terminals.

Step S62: The PLC periodically delivers an IOB packet, and the PLC adds the timestamp $T_0$ to each IOB packet.

Step S63: Each time the optical head end receives one IOB packet sent by the PLC, the optical head end adds ($T_0$, $\Delta t$, $T_{dwelt}$) or ($T_0 + \Delta t - T_{dwelt}$), $T_{eqd}$(max), $T_{Offset0}$, and $T_{Offset1}$ to the IOB packet. The optical head end sends the IOB packet including ($T_0$, $\Delta t$, $T_{dwelt}$) or ($T_0 + \Delta t - T_{dwelt}$), $T_{eqd}$ (max), $T_{Offset0}$, and $T_{Offset1}$ to each optical terminal.

($T_0$, $\Delta t$, $T_{dwell}$) or ($T_0 + \Delta t - T_{dwell}$), $T_{eqd}$(max), $T_{Offset0}$, and $T_{Offset1}$ are optionally carried in the timestamp field of the IOB packet, or carried in the PDU field of the IOB packet, or partially carried in the timestamp field of the IOB packet and partially carried in the PDU field of the IOB packet.

Step S64: Each optical terminal receives the IOB packet sent by the optical head end, and each optical terminal obtains, from the IOB packet, execution content, calculation process data, and ($T_0$, $\Delta t$, $T_{dwell}$) or ($T_0 + \Delta t - T_{dwell}$), $T_{eqd}$ (max), $T_{Offset0}$, and $T_{Offset1}$ added by the optical head end. Each optical terminal separately determines a time $T_{Sync0}$ and the time $T_{Sync1}$ based on ($T_0$, $\Delta t$, $T_{dwell}$) or ($T_0 + \Delta t - T_{dwell}$), $T_{eqd}$(max), $T_{Offset0}$, and $T_{Offset1}$ by using the following formula (3) and formula (4).

$$T_{Sync0} = T_0 + \Delta t - T_{dwell} + T_{eqd}(\text{max}) + T_{Offset0} \qquad \text{formula (3)}$$

$$T_{Sync1} = T_{Sync0} + T_{Offset1} \qquad \text{formula (4)}$$

The $T_{Sync0}$ in formula (3) indicates a time point at which the instructions are executed. The $T_{Sync1}$ in formula (4) indicates a collected and reported time point.

Step S65: When the time $T_{Sync0}$ arrives, the optical terminal generates the synchronization signal Sync0 (similar to interruption). Each slave station receives the synchronization signal Sync0, and executes corresponding instructions based on the execution content obtained from the optical terminal.

Step S66: After the synchronization signal Sync0 is triggered, when the time $T_{Sync1}$ arrives after $T_{Offset1}$, the optical terminal generates the synchronization signal Sync1 (similar to interruption). After receiving the synchronization signal Sync1, the slave station performs the data collection operation and reports the collected data to the PLC. The collected data reported by the slave station is forwarded by the optical terminal and the optical head end to the PLC.

The following describes $T_0$ and the $\Delta t$ in specific example 2. For other parameters other than $T_0$ and the $\Delta t$ in specific example 2, refer to descriptions in specific example 1.

In a specific example 2, $T_0$ is the timestamp added to the packet when the PLC generates the packet. The purpose of adding $T_0$ to the PLC is as the following: Considering that the PLC and the optical head end/optical terminal use the same time source, to enable the optical terminal to have a start reference of time when Sync0/Sync1 is executed, $T_0$ is added to the PLC.

The $\Delta t$ indicates a delay from the PLC to the optical head end. A time point, $T_1 = T_0 + \Delta t$, at which the optical head end receives the packet. In other words, the $\Delta t$ represents a delay between the time point at which the optical head end receives the packet and a time point at which the PLC adds the timestamp.

The foregoing describes a possible implementation procedure of specific example 2. In specific example 2, it is optional that $T_{Sync0}$ and $T_{Sync1}$ are calculated by the optical terminal. Alternatively, the optical head end is responsible for calculating $T_{Sync0}$ and $T_{Sync1}$. Specifically, step S63 may be replaced with the following step S63', and step S64 may be replaced with the following step S64'.

Step S63': Each time the optical head end receives one IOB packet sent by the PLC, the optical head end obtains the timestamp $T_0$ from the IOB packet sent by the PLC. The optical head end determines $T_{Sync0}$ and $T_{Sync1}$ based on $T_0$, $T_{dwell}$, $T_{eqd}$(max), $T_{Offset0}$, and $T_{Offset1}$ by using the foregoing formula (3) and formula (4), and the optical head end adds $T_{Sync0}$ and $T_{Sync1}$ to the IOB packet, and sends the IOB packet including $T_{Sync0}$ and $T_{Sync1}$ to each optical terminal.

Step S64': Each optical terminal receives the IOB packet sent by the optical head end, and each optical terminal obtains, from the IOB packet, the execution content, the calculation process data, and $T_{Sync0}$ and $T_{Sync1}$ added by the optical head end.

Figure 13:
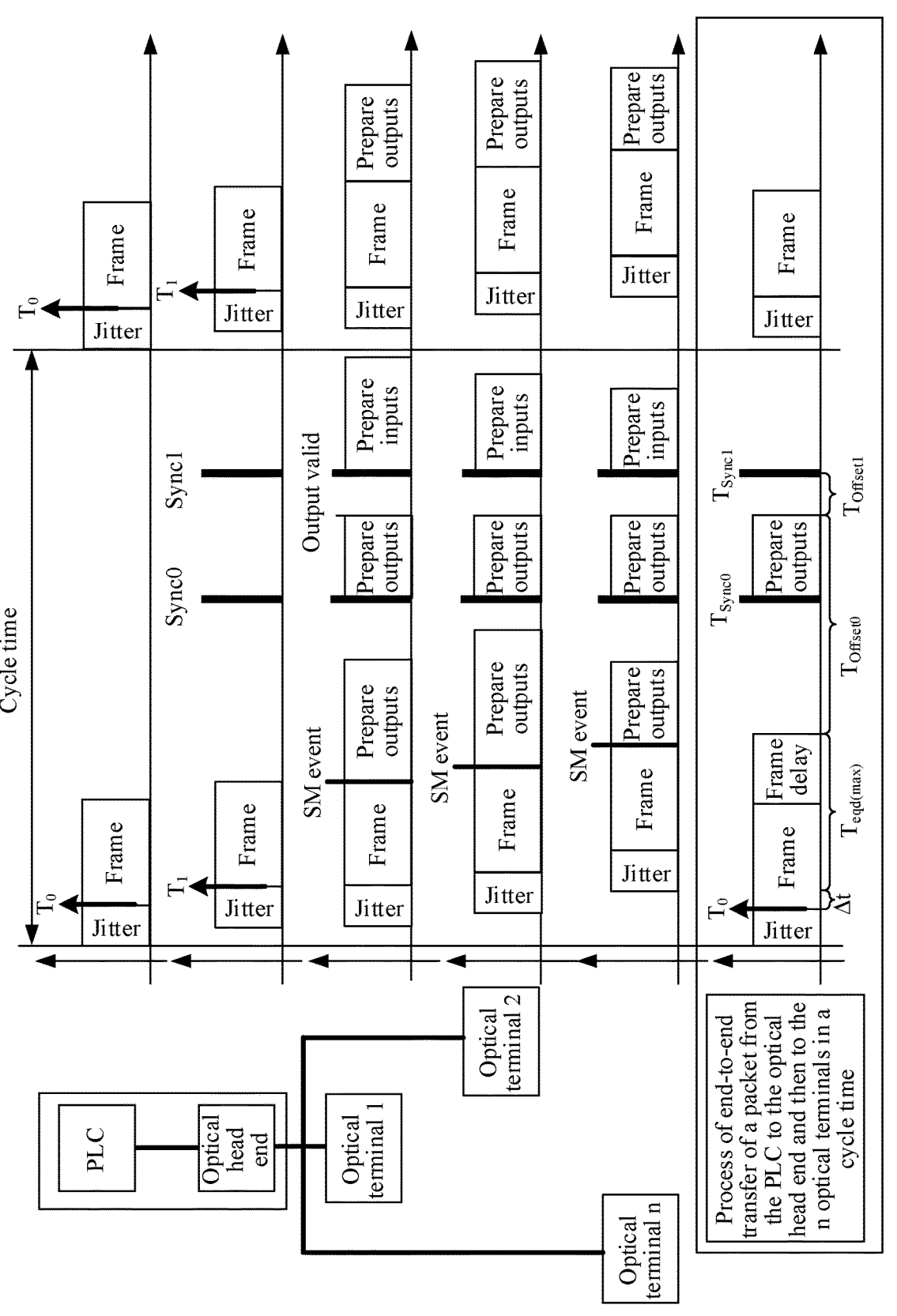
FIG. 13 is a schematic diagram of clock synchronization in a scenario of a same clock source according to an embodiment of this application.

FIG. 13 is a schematic diagram of clock synchronization in a scenario of a same clock source of the PLC and the optical head end. Different from the clock synchronization process shown in FIG. 11, the timestamp $T_0$ is added to the packet starting from the PLC, and the $\Delta t$ is considered in each cycle. For meanings of other parameters in FIG. 13, refer to the description of FIG. 11.

The foregoing embodiments can achieve the following effects (1) to (4).

(1) A global high-precision clock/time synchronization solution applicable to an industrial optical bus is implemented.

(2) An optical bus supports a function of carrying the timestamp in the collected data. Therefore, statistics can be collected on a working time length of each step in industrial manufacturing, to facilitate optimization and analysis of an entire manufacturing process and resolve a pain point of refined management in an industrial field.

(3) Connection of multiple networks to one network, use of one same network till the end, and network-wide precise timestamp are supported.

Specifically, a traditional field bus such as ETherCAT is applicable only to a real-time service. In addition, ETherCAT is a non-standard Ethernet protocol and cannot be connected to standard Ethernet. The industrial optical bus is compatible with a standard PON protocol. If networks at all levels use the PON network, the "connection of multiple networks to one network" and "use of one same network till the end" can be implemented.

(4) It is applicable to a wide range of applications, for example, GPON, XGPON, XGSPON, Ethernet passive optical network (EPON), 10G EPON, and time division and wavelength division multiplexing PON (TWDM PON).

The following describes a principle of implementing the clock synchronization between the optical head end and the plurality of optical terminals based on the PON system in the foregoing embodiments.

A PON-based frequency synchronization principle of the optical head end and the plurality of optical terminals is optionally using a physical line clock of the PON to implement frequency synchronization. Specifically, the optical head end receives input of a high-precision frequency source (such as BTS input or a synchronous Ethernet interface); the optical head end recovers a precise clock from the high-precision frequency source; the optical head end uses the recovered clock as a modulation clock of a PON downlink line; the optical head end transmits the clock of the PON downlink line to the optical terminal through an optical fiber line; and the optical terminal recovers a clock through CDR to implement synchronous following of an external input reference clock of the optical head end.

A PON-based time synchronization principle of the optical head end and multiple optical terminals is optionally a time synchronization mechanism defined in an ITU-TG.984 standard. Specifically, the optical head end first completes the time synchronization with an upper-level device. The optical head end calculates corresponding ToDx,i (Time of Day, time) when the $X^{th}$ super frame arrives at an optical terminal i. The optical head end notifies, by using an optical network unit management and control interface (OMCI)

message, the optical terminal i of the corresponding ToDx,i when the $X^{th}$ super frame arrives at the optical terminal i. After receiving the OMCI message, the optical terminal i performs corresponding compensation on ToDx,i to obtain accurate arrival time of the $X^{th}$ frame, real_ToDx,i. When the $X^{th}$ frame arrives, the optical terminal i sets local time thereof to the Real_ToDx,i, that is, the time synchronization is completed. Alternatively, the time synchronization is performed between the optical head end and the plurality of optical terminals through another standard defined time synchronization process in a PON network.

$T_{Sync0}$ in formula (3) represents a time point at which the instruction is executed. $T_{Sync1}$ in formula (4) represents a time point at which collection and reporting are performed.

Step S65: When the time point $T_{Sync0}$ is reached, the optical terminal generates a synchronization signal sync0 (similar to an interrupt). The slave station receives the synchronization signal sync0, and executes corresponding instruction based on the execution content obtained from the optical terminal.

Step S66: After the synchronization signal sync0 is triggered, when the time point $T_{Sync1}$ is reached after $T_{Offset1}$, the optical terminal generates a synchronization signal Sync1 (similar to an interrupt). After receiving the synchronization signal Sync1, the slave station performs the data collection operation and reports collected data to the PLC. The collected data reported by the slave station is forwarded by the optical terminal and the optical head end to the PLC.

The following describes $T_0$ and $\Delta t$ in specific example 2. For parameters other than $T_0$ and $\Delta t$ in specific example 2, refer to descriptions in specific example 1.

In specific example 2, $T_0$ is the timestamp added to the packet when the PLC generates the packet. An effect of adding $T_0$ by the PLC is as follows: Considering that the PLC and the optical head end/optical terminals use the same time source, to allow the optical terminals to have a start time reference for execution of Sync0/Sync1, the PLC adds $T_0$.

At represents a delay from the PLC to the optical head end. A time point at which the optical head end receives the packet is $T_1 = T_0 + \Delta t$. In other words, $\Delta t$ represents a delay between the time point at which the optical head end receives the packet and the time point at which the PLC adds the timestamp.

The foregoing describes a possible implementation procedure of specific example 2. In specific example 2, the calculation of $T_{Sync0}$ and $T_{Sync1}$ by the optical terminal is optional. Alternatively, the optical head end is responsible for calculating $T_{Sync0}$ and $T_{Sync1}$. Specifically, step S63 may be replaced with the following step S63', and step S64 may be replaced with the following step S64'.

Step S63': Each time the optical head end receives one IOB packet sent by the PLC, the optical head end obtains a timestamp $T_0$ from the IOB packet sent by the PLC. The optical head end determines $T_{Sync0}$ and $T_{Sync1}$ based on $T_0$, $T_{dwell}$, $T_{eqd}$(max), $T_{Offset0}$, and $T_{Offset1}$ by using the foregoing formula (3) and formula (4), and the optical head end adds $T_{Sync0}$ and $T_{Sync1}$ to the IOB packet, and sends the IOB packet including $T_{Sync0}$ and $T_{Sync1}$ to each optical terminal.

Step S64': Each optical terminal receives the IOB packet sent by the optical head end, and each optical terminal obtains, from the IOB packet, execution content, calculation process data, and $T_{Sync0}$ and $T_{Sync1}$ added by the optical head end.

FIG. 13 is a schematic diagram of clock synchronization in a scenario in which the PLC and the optical head end use a same clock source. Different from the clock synchronization process shown in FIG. 11, the timestamp $T_0$ is added to the packet by the PLC, and $\Delta t$ is considered in each cycle time. For meanings of other parameters in FIG. 13, refer to the description of FIG. 11.

The foregoing embodiments can achieve the following effects (1) to (4).

(1) A global high-precision clock/time synchronization solution applicable to an industrial optical bus is achieved.

(2) An optical bus supports a function of carrying a timestamp in collected data. Therefore, statistics can be collected on operational duration of each step in industrial manufacturing, to facilitate optimization and analysis of an entire manufacturing process and resolve a pain point of refined management at an industrial site.

(3) Multi-network convergence, an all optical network, and a network-wide precise timestamp are supported. Specifically, conventional field buses such as ETherCAT are applicable only to real-time services. In addition, ETherCAT is a non-standard Ethernet protocol and cannot be connected to a standard Ethernet. The industrial optical bus is compatible with a standard PON protocol. If networks at all levels use the PON network, "multi-network convergence" and "all optical network" can be achieved.

(4) The foregoing embodiments are applicable to a wide range of applications, for example, GPON, XGPON, XGSPON, Ethernet passive optical network (EPON), 10G EPON, and time division and wavelength division multiplexing PON (TWDM PON).

The following describes a principle of implementing clock synchronization between the optical head end and the plurality of optical terminals based on the PON system in the foregoing embodiments.

Optionally, a principle of PON-based frequency synchronization between the optical head end and the plurality of optical terminals is implementing frequency synchronization using a physical line clock of the PON. Specifically, the optical head end receives an input of a high-precision frequency source (such as a BTS input or a synchronous Ethernet interface). The optical head end recovers a precise clock from the high-precision frequency source. The optical head end uses the recovered clock as a modulation clock of a PON downlink line. The optical head end transfers the clock of the PON downlink line to the optical terminal through an optical fiber line. The optical terminal recovers a clock through CDR to implement synchronous following of an external input reference clock of the optical head end.

Optionally, the principle of PON-based frequency synchronization between the optical head end and the plurality of optical terminals is a time synchronization mechanism defined in the ITU-T G.984 standard. Specifically, the optical head end first completes time synchronization with an upper-level device. The optical head end calculates corresponding ToDx,i (Time of Day, time) that is when an $X^{th}$ super frame arrives at an optical terminal i. The optical head end informs, through an optical network unit management and control interface (OMCI) message, the optical terminal i of the corresponding ToDx,i that is when the $X^{th}$ super frame arrives at the optical terminal i. After receiving the OMCI message, the optical terminal i performs corresponding compensation on ToDx,i to obtain a precise arrival time point real_ToDx,i of the $X^{th}$ frame. When the $X^{th}$ frame arrives, the optical terminal i sets local time thereof to Real_ToDx,i. In this way, the time synchronization is complete. Alternatively, time synchronization is performed between the optical head end and the plurality of optical terminals through a time synchronization process in a PON network defined in another standard.

Figure 14:
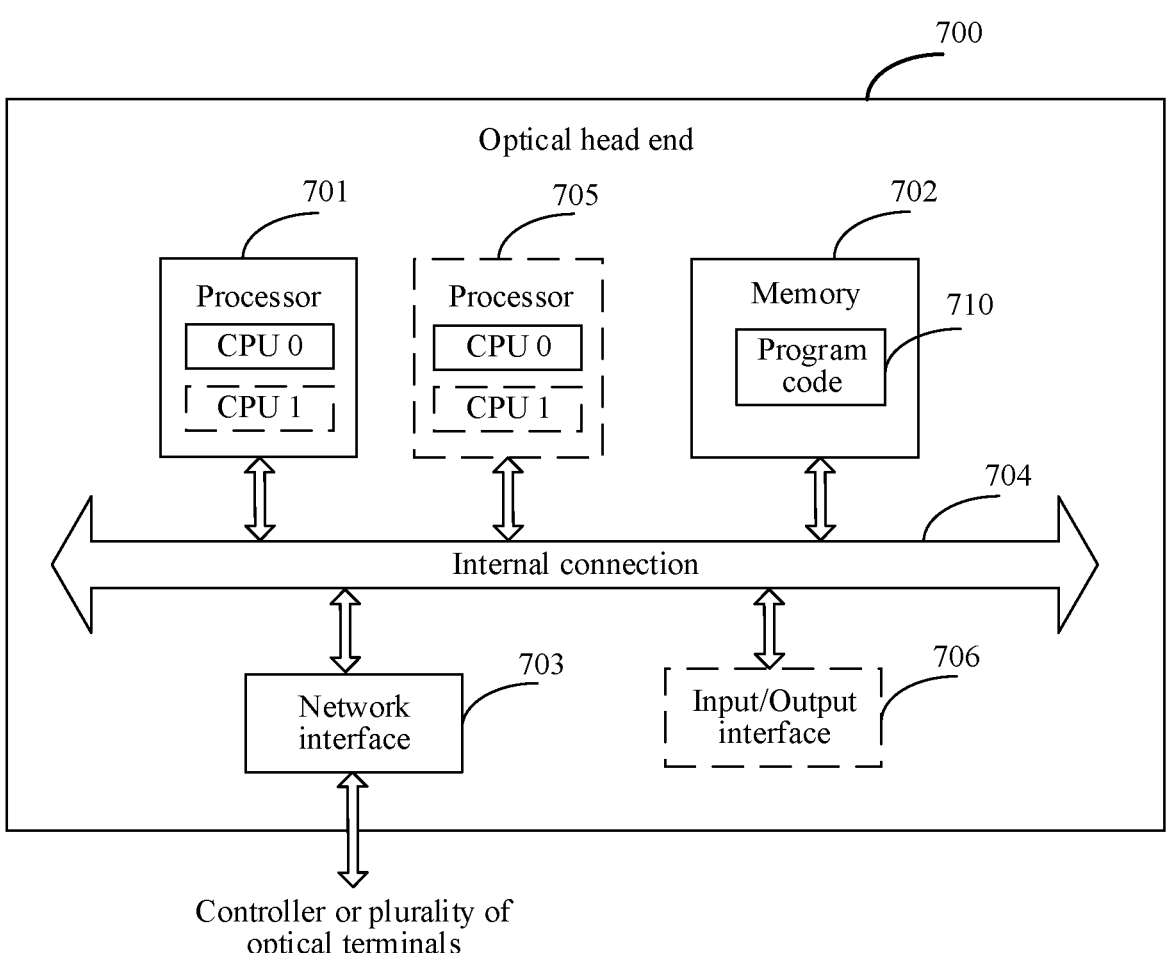
FIG. 14 is a schematic diagram of a structure of an optical head end according to an embodiment of this application.

FIG. 14 is a schematic diagram of a structure of an optical head end according to an embodiment of this application. The optical head end 700 shown in FIG. 14 is configured to implement the clock synchronization method described in FIG. 8.

Optionally, with reference to FIG. 7, the optical head end 700 shown in FIG. 14 is the optical head end in FIG. 7.

Optionally, with reference to FIG. 9, the optical head end 700 shown in FIG. 14 is the optical head end in FIG. 9.

Optionally, with reference to FIG. 12, the optical head end 700 shown in FIG. 14 is the optical head end in FIG. 12.

Optionally, with reference to FIG. 8, the optical head end 700 shown in FIG. 14 is the optical head end in the method flowchart shown in FIG. 8.

The optical head end 700 includes at least one processor 701, a memory 702, and at least one network interface 703.

The processor 701 is, for example, a general-purpose central processing unit (CPU), a network processor (NP), a graphics processing unit (GPU), a neural network processing unit (NPU), a data processing unit (DPU), a microprocessor, or one or more integrated circuits configured to implement the solutions of this application. For example, the processor 701 includes an application-specific integrated circuit (ASIC), a programmable logic device (PLD), or a combination thereof. The PLD is, for example, a complex programmable logic device (CPLD), a field-programmable gate array (FPGA), generic array logic (GAL), or any combination thereof.

The memory 702 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that is accessible by a computer, but is not limited thereto. Optionally, the memory 702 exists independently, and is connected to the processor 701 through an internal connection 704. Alternatively, optionally, the memory 702 and the processor 701 are integrated together.

The network interface 703 is any apparatus of a transceiver type and is configured to communicate with another device or a communication network. The network interface 703 includes, for example, at least one of a wired network interface or a wireless network interface. The wired network interface is, for example, an Ethernet interface. The Ethernet interface is, for example, an optical interface, an electrical interface, or a combination thereof. The wireless network interface is, for example, a wireless local area network (WLAN) interface, a cellular network interface, or a combination thereof.

In some embodiments, the processor 701 includes one or more CPUs, for example, a CPU 0 and a CPU 1 shown in FIG. 14.

In some embodiments, the optical head end 700 optionally includes a plurality of processors, for example, the processor 701 and a processor 705 shown in FIG. 14. Each of the processors is, for example, a single-core processor (single-CPU) or a multi-core processor (multi-CPU). The processor optionally refers to one or more devices, circuits, and/or processing cores configured to process data (for example, computer program instructions).

In some embodiments, the optical head end 700 further includes the internal connection 704. The processor 701, the memory 702, and the at least one network interface 703 are connected through the internal connection 704. The internal connection 704 includes a channel for transmitting information between the foregoing components. Optionally, the internal connection 704 is a board or a bus. Optionally, the internal connection 704 includes an address bus, a data bus, a control bus, and the like.

In some embodiments, the optical head end 700 further includes an input/output interface 706. The input/output interface 706 is connected to the internal connection 704.

Optionally, the processor 701 implements the method according to the foregoing embodiments by reading program code 710 stored in the memory 702, or the processor 701 implements the method according to the foregoing embodiments by running program code stored therein. When the processor 701 implements the method according to the foregoing embodiments by reading the program code 710 stored in the memory 702, the memory 702 stores the program code for implementing the method according to embodiments of this application.

For more details of implementing the foregoing functions by the processor 701, refer to the descriptions in the foregoing method embodiments. Details are not described herein again.

Figure 15:
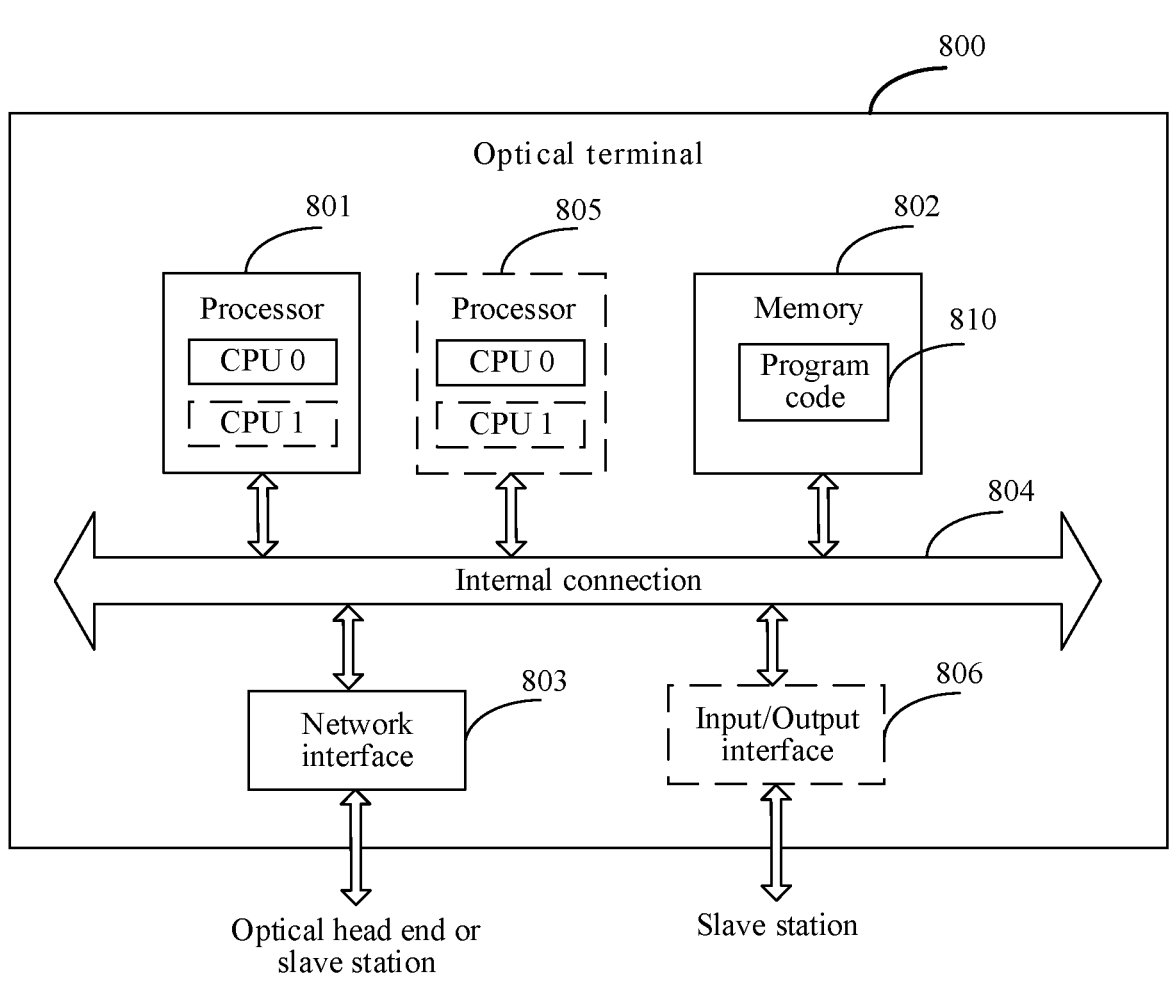
FIG. 15 is a schematic diagram of a structure of an optical terminal according to an embodiment of this application.

FIG. 15 is a schematic diagram of a structure of an optical terminal according to an embodiment of this application. The optical terminal 800 shown in FIG. 15 is configured to implement the clock synchronization method described in FIG. 8.

Optionally, with reference to FIG. 7, the optical terminal 800 shown in FIG. 15 is the optical terminal in FIG. 7.

Optionally, with reference to FIG. 9, the optical terminal 800 shown in FIG. 15 is the optical terminal in FIG. 9.

Optionally, with reference to FIG. 12, the optical terminal 800 shown in FIG. 15 is the optical terminal in FIG. 12.

Optionally, with reference to FIG. 8, the optical terminal 800 shown in FIG. 15 is the first optical terminal in the method flowchart shown in FIG. 8.

The optical terminal 800 includes at least one processor 801, a memory 802, and at least one network interface 803.

The processor 801 is, for example, a general-purpose central processing unit (CPU), a network processor (NP), a graphics processing unit (GPU), a neural network processing unit (NPU), a data processing unit (DPU), a microprocessor, or one or more integrated circuits configured to implement the solutions of this application. For example, the processor 801 includes an application-specific integrated circuit (ASIC), a programmable logic device (PLD), or a combination thereof. The PLD is, for example, a complex programmable logic device (CPLD), a field-programmable gate array (FPGA), generic array logic (GAL), or any combination thereof.

The memory 802 is, for example, a read-only memory (ROM) or another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that is accessible by a computer, but is not limited thereto. Optionally, the memory 802 exists independently, and is connected to the processor 801 through an internal connection 804. Alternatively, optionally, the memory 802 and the processor 801 are integrated together.

The network interface 803 is any apparatus of a transceiver type and is configured to communicate with another device or a communication network. The network interface 803 includes, for example, at least one of a wired network interface or a wireless network interface. The wired network interface is, for example, an Ethernet interface. The Ethernet interface is, for example, an optical interface, an electrical interface, or a combination thereof. The wireless network interface is, for example, a wireless local area network (WLAN) interface, a cellular network interface, or a combination thereof.

When the method shown in FIG. 8 is performed, the network interface 803 is specifically configured to communicate with an optical head end or a slave station. For example, in a scenario in which the slave station is a server, the network interface 803 is an Ethernet interface or an SPI, and the network interface 803 is configured to communicate with the slave station.

In some embodiments, the processor 801 includes one or more CPUs, for example, a CPU 0 and a CPU 1 shown in FIG. 15.

In some embodiments, the optical terminal 800 optionally includes a plurality of processors, for example, the processor 801 and a processor 805 shown in FIG. 15. Each of these processors is, for example, a single-core processor (single-CPU) or a multi-core processor (multi-CPU). The processor optionally refers to one or more devices, circuits, and/or processing cores configured to process data (for example, computer program instructions).

In some embodiments, the optical terminal 800 further includes the internal connection 804. The processor 801, the memory 802, and the at least one network interface 803 are connected through the internal connection 804. The internal connection 804 includes a channel for transmitting information between the foregoing components. Optionally, the internal connection 804 is a board or a bus. Optionally, the internal connection 804 includes an address bus, a data bus, a control bus, and the like.

In some embodiments, the optical terminal 800 further includes an input/output interface 806. The input/output interface 806 is connected to the internal connection 804.

In some embodiments, the input/output interface 806 is configured to communicate with the slave station. For example, when the slave station is an I/O device, the input/output interface 806 is configured to connect to the slave station, and the input/output interface 806 is configured to output, to the slave station, service data sent by a controller, receive collected data sent by the slave station, and output a synchronization signal to the slave station.

Optionally, the processor 801 implements the method according to the foregoing embodiments by reading program code 810 stored in the memory 802, or the processor 801 implements the method according to the foregoing embodiments by running program code stored therein. When the processor 801 implements the method according to the foregoing embodiments by reading the program code 810 stored in the memory 802, the memory 802 stores the program code for implementing the method according to embodiments of this application.

For more details of implementing the foregoing functions by the processor 801, refer to the descriptions in the foregoing method embodiments. Details are not described herein again.

Figure 16:
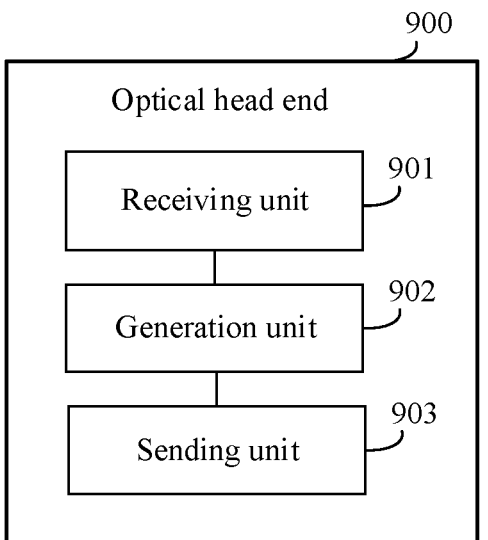
FIG. 16 is a schematic diagram of a structure of an optical head end according to an embodiment of this application.

FIG. 16 is a schematic diagram of a structure of an optical head end according to an embodiment of this application. The optical head end 900 shown in FIG. 16 implements, for example, the method shown in FIG. 8, or functions of the optical head end in the foregoing specific example 1 or specific example 2.

Refer to FIG. 16. The optical head end 900 includes a receiving unit 901, a generation unit 902, and a sending unit 903. The receiving unit 901 is configured to support the optical head end 900 in performing S202. The generation unit 902 is configured to support the optical head end 900 in performing S203. The sending unit 903 is configured to support the optical head end 900 in performing S204.

The apparatus embodiment described in FIG. 16 is merely an example. For example, division into the units is merely logical function division and may be other division in actual implementation. For example, a plurality of units or components may be combined or integrated into another system, or some features may be ignored or not performed. Functional units in embodiments of this application may be integrated into one processing unit, each of the units may exist alone physically, or two or more units are integrated into one unit.

All or some of the units in the optical head end 900 are implemented through software, hardware, firmware, or any combination thereof.

The units in FIG. 16 may be implemented in a form of hardware, or may be implemented in a form of a software functional unit. For example, when software is used for implementation, the generation unit 902 may be implemented through a software functional unit generated after the at least one processor 701 in FIG. 14 reads the program code stored in the memory 702. Alternatively, the units in FIG. 16 may be separately implemented through different hardware in the optical head end. For example, the generation unit 902 is implemented through some of processing resources (for example, one core or two cores in a multi-core processor) in the at least one processor 701 in FIG. 14. For another example, the generation unit 902 is implemented through a programmable device such as a field-programmable gate array (FPGA) or a coprocessor. The receiving unit 901 and the sending unit 903 are implemented through the network interface 703 in FIG. 14. It is clear that the foregoing functional units may also be implemented through a combination of software and hardware. For example, the sending unit 903 is implemented through a hardware programmable device, and the generation unit 902 is implemented through a software functional unit generated after a CPU reads program code stored in a memory.

Figure 17:
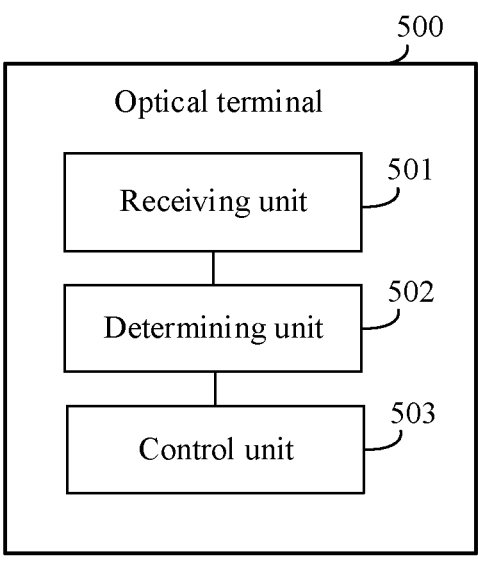
FIG. 17 is a schematic diagram of a structure of an optical terminal according to an embodiment of this application.

FIG. 17 is a schematic diagram of a structure of an optical terminal according to an embodiment of this application. The optical terminal 500 shown in FIG. 17 implements, for example, a function of the first optical terminal in the method shown in FIG. 8.

Refer to FIG. 17. The optical terminal 500 includes a receiving unit 501, a determining unit 502, and a control unit 503. The receiving unit 501 is configured to support the optical terminal 500 in performing S205. The determining unit 502 is configured to support the optical terminal 500 in performing S206. The control unit 503 is configured to support the optical terminal 500 in performing S207.

The apparatus embodiment described in FIG. 17 is merely an example. For example, division into the units is merely logical function division and may be other division in actual implementation. For example, a plurality of units or components may be combined or integrated into another system, or some features may be ignored or not performed. Functional units in embodiments of this application may be integrated into one processing unit, each of the units may exist alone physically, or two or more units are integrated into one unit. The units in FIG. 17 may be implemented in a form of hardware, or may be implemented in a form of a software functional unit. For example, when software is used for implementation, the determining unit 502 and the control unit 503 may be implemented through a software functional unit generated after the at least one processor 701 in FIG. 14 reads the program code stored in the memory 702. Alternatively, the units in FIG. 17 may be separately implemented through different hardware in the optical terminal. For example, the determining unit 502 is implemented through some of processing resources (for example, one core or two cores in a multi-core processor) in the at least one processor 701 in FIG. 14. The control unit 503 is implemented through other processing resources (for example, another core in the multi-core processor) in the at least one processor 701 in FIG. 14, or is implemented through a programmable device such as a field-programmable gate array (FPGA) or a coprocessor. The receiving unit 501 is implemented through the network interface 703 in FIG. 14. It is clear that the foregoing functional units may also be implemented through a combination of software and hardware. For example, the determining unit 502 is implemented through a hardware programmable device, and the control unit 503 is implemented through a software functional unit generated after a CPU reads program code stored in a memory.

Embodiments in this specification are described in a progressive manner. For same or similar parts in the embodiments, refer to each other. Each embodiment focuses on a difference from other embodiments. Referring to B for A means that A is the same as B or A is a simple variant of B.

In this specification and the claims in embodiments of this application, the terms "first", "second", and the like are used for distinguishing between different objects, not for describing a particular order of objects, and shall not be construed as indicating or implying relative importance For example, a first packet and a second packet are used for distinguishing between different packets, not for describing a particular order of the packets, and shall not be construed as that the first packet is more important than the second packet.

In embodiments of this application, unless otherwise specified, "at least one" means one or more, and "a plurality of" means two or more. For example, a plurality of slave stations means two or more slave stations.

All or some of the foregoing embodiments may be implemented through software, hardware, firmware, or any combination thereof. When software is used for implementation, all or some of the embodiments may be implemented in a form of a computer program product. The computer program product includes one or more computer instructions. When the computer program instructions are loaded and executed on a computer, all or some of procedures or functions described in embodiments of this application are executed. The computer may be a general-purpose computer, a dedicated computer, a computer network, or any other programmable apparatus. The computer instructions may be stored in a computer-readable storage medium, or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing embodiments are merely intended for describing the technical solutions of this application, but not for limiting this application. Although this application is described in detail with reference to the foregoing embodiments, a person of ordinary skilled in the art should understand that modifications may still be made to the technical solutions described in the foregoing embodiments or equivalent replacements may be made to some technical features, and such modifications or replacements do not cause the essence of the corresponding technical solutions to depart from the scope of embodiments of this application.

What is claimed is:

1. A method for clock synchronization, applied to an optical bus network, wherein the optical bus network comprises a controller, an optical head end, a plurality of optical terminals, and a plurality of slave stations, and the method comprises:

receiving, by the optical head end, a first packet from the controller, wherein the first packet comprises service data to be transmitted to the plurality of slave stations;

generating, by the optical head end, a second packet based on the first packet, wherein the second packet comprises the service data and time information, and the time information indicates an execution time point at which the plurality of slave stations perform an operation based on the service data simultaneously, wherein the time information comprises reference time that indicates a time point at which the optical head end receives the service data; and sending, by the optical head end, the second packet to the plurality of optical terminals to instruct the plurality of optical terminals to control the plurality of slave stations to perform the operation at the execution time point based on the service data simultaneously.

2. The method according to claim 1, wherein the reference time is a timestamp added by the optical head end.

3. The method according to claim 1, wherein the time information further comprises a compensation delay, and the compensation delay indicates a time difference between the reference time and the execution time point.

4. The method according to claim 3, wherein the compensation delay comprises one or more of:

dwelt duration, wherein the dwelt duration indicates duration for which the first packet is dwelt on the optical head end;

of a transmission delay, wherein the transmission delay indicates a delay of transmitting the first packet from the controller to the optical head end.

5. The method according to claim 3, wherein the compensation delay comprises one or more of:

first offset duration, wherein the first offset duration indicates duration required by a slave station with a lowest processing speed among the plurality of slave stations to process the service data; or second offset duration, wherein the second offset duration indicates duration required by the slave station with the slowest processing speed to proceed from executing an instruction of the controller to starting a data collection operation.

6. The method according to claim 1, wherein the execution time point indicated by the time information comprises a first time point, and the controlling the plurality of slave stations to perform the operation at the execution time point based on the service data comprises:

controlling the plurality of slave stations to execute an instruction comprised in the service data at the first time point.

7. The method according to claim 1, wherein the execution time point indicated by the time information comprises a second time point, and the controlling the plurality of slave stations to perform the operation at the execution time point based on the service data comprises:

controlling the plurality of slave stations to perform a data collection operation at the second time point.

8. The method according to claim 7, wherein after the sending, by the optical head end, the second packet to the plurality of optical terminals, the method further comprises:

receiving, by the optical head end, collected data sent by the plurality of optical terminals, wherein the collected data is obtained by the plurality of slave stations by performing the data collection operation; and sending, by the optical head end, the collected data to the controller.

9. The method according to claim 1, wherein the time information is carried in a timestamp field of the second packet; or the time information is carried in a protocol data unit (PDU) field of the second packet.

10. The method according to claim 1, wherein the service data comprises calculation process data that is generated through calculation by the controller in a three-loop control operation.

11. A method for clock synchronization, applied to an optical bus network, wherein the optical bus network comprises a controller, an optical head end, a plurality of optical terminals, and a plurality of slave stations, the plurality of optical terminals comprise a first optical terminal, the plurality of slave stations comprise a first slave station connected to the first optical terminal, and the method comprises:

receiving, by the first optical terminal, a packet from the optical head end, wherein the packet comprises service data from the controller and time information, and the time information indicates an execution time point at which the plurality of slave stations perform an operation based on the service data simultaneously, wherein the time information comprises reference time that indicates a time point at which the optical head end receives the service data;

determining, by the first optical terminal, the execution time point based on the time information; and controlling, by the first optical terminal, the first slave station to perform the operation at the execution time point based on the service data simultaneously with another slave station in the plurality of slave stations.

12. The method according to claim 11, wherein the determining, by the first optical terminal, the execution time point based on the time information comprises:

determining, by the first optical terminal, the execution time point based on the reference time and a compensation delay, wherein the compensation delay indicates a time difference between the reference time and the execution time point.

13. The method according to claim 12, wherein the compensation delay comprises one or more of:

dwelt duration, wherein the dwelt duration indicates duration for which the packet is dwelt on the optical head end;

first offset duration, wherein the first offset duration indicates duration required by a slave station with a lowest processing speed among the plurality of slave stations to process the service data;

second offset duration, wherein the second offset duration indicates duration required by the slave station with the slowest processing speed to proceed from executing an instruction of the controller to starting a data collection operation; or a transmission delay, wherein the transmission delay indicates a delay of transmitting the packet from the controller to the optical head end.

14. The method according to claim 12, wherein the compensation delay is carried in the packet; or before the receiving, by the first optical terminal, a packet from the optical head end, the method further comprises: receiving, by the first optical terminal, the compensation delay from the optical head end.

15. The method according to claim 11, wherein the time information indicates the execution time point at which the first slave station performs the operation based on the service data, and the determining, by the first optical terminal, the execution time point based on the time information comprises:

using, by the first optical terminal, a time point indicated by the time information as the execution time point.

16. The method according to claim 11, wherein the execution time point indicated by the time information comprises a first time point, and the controlling, by the first optical terminal, the first slave station to perform the operation at the execution time point based on the service data comprises:

controlling, by the first optical terminal, the first slave station to execute an instruction comprised in the service data at the first time point.

17. The method according to claim 11, wherein the execution time point indicated by the time information comprises a second time point, and the controlling, by the first optical terminal, the first slave station to perform the operation at the execution time point based on the service data comprises:

controlling, by the first optical terminal, the first slave station to perform a data collection operation at the second time point.

18. The method according to claim 11, wherein the service data comprises calculation process data that is generated through calculation by the controller in a three-loop control operation.

19. An optical head end, wherein the optical head end comprises:

a transceiver, configured to receive a first packet from a controller, wherein the first packet comprises service data to be transmitted to a plurality of slave stations; and at least one processor, configured to generate a second packet based on the first packet, wherein the second packet comprises the service data and time information, and the time information indicates an execution time point at which the plurality of slave stations perform an operation based on the service data simultaneously, wherein the time information comprises reference time that indicates a time point at which the optical head end receives the service data, wherein:

the transceiver is further configured to send the second packet to a plurality of optical terminals to instruct the plurality of optical terminals to control the plurality of slave stations to perform the operation at the execution time point based on the service data simultaneously.

20. An optical terminal, wherein the optical terminal comprises:

a transceiver, configured to receive a packet from an optical head end, wherein the packet comprises service data from a controller and time information, and the time information indicates an execution time point at which a plurality of slave stations perform an operation based on the service data simultaneously, wherein the time information comprises reference time that indicates a time point at which the optical head end receives the service data; and at least one processor, configured to determine the execution time point based on the time information, wherein:

the transceiver is further configured to control a first slave station connected to the optical terminal to perform the operation at the execution time point based on the service data simultaneously with another slave station in the plurality of slave stations.

* * * * *